United States Patent [19]
Masuda et al.

[11] Patent Number: 5,471,334
[45] Date of Patent: Nov. 28, 1995

[54] METHOD AND APPARATUS FOR MONITORING NOISE FIGURE OF OPTICAL AMPLIFIER

[75] Inventors: Hiroji Masuda; Kazuo Aida; Kiyoshi Nakagawa, all of Kanagawa, Japan

[73] Assignee: Nippon Telegraph and Telephone Corporation, Tokyo, Japan

[21] Appl. No.: 139,227

[22] Filed: Oct. 19, 1993

[30] Foreign Application Priority Data

Oct. 21, 1992 [JP] Japan .................................... 4-282890
Jun. 18, 1993 [JP] Japan .................................... 5-147706

[51] Int. Cl.$^6$ .................................................. H04B 17/00
[52] U.S. Cl. .................................. 359/177; 359/176
[58] Field of Search ...................... 359/174, 175, 359/176, 177, 178, 179, 337, 341, 343, 110; 250/225, 227.17; 372/6, 27; 385/122; 340/825.06, 825.16, 825.17

[56] References Cited

FOREIGN PATENT DOCUMENTS

| | | |
|---|---|---|
| 4181210 | 6/1992 | Japan . |
| 4356984 | 12/1992 | Japan . |
| 5206555 | 8/1993 | Japan . |
| 2242091 | 9/1991 | United Kingdom .................... 359/177 |

OTHER PUBLICATIONS

European Search Report dated Feb. 11, 1994 1990 Technical Digest Series, Optical Amplifiers and their Applications, vol. 13, 6 Sep. 1990, Monterey, Calif., US, pp. 134–137.
Patent Abstracts of Japan, vol. 16, No. 500 dated 15 Oct. 1991 & JP-A-04 181 210 (Fujitsu).
Electronics Letters, vol. 27, No. 9 dated 25 Apr. 1991, Stevenage GB.
OFC '92, Technical Digest, Optical Fibert Communication Conference Article.

Primary Examiner—Hezron E. Williams
Assistant Examiner—Richard A. Moller
Attorney, Agent, or Firm—Banner & Allegretti, Ltd.

[57] ABSTRACT

A method and an apparatus for monitoring the noise figure of an optical amplifier such as used in linear repeaters in an optical transmission system formed by cascaded linear repeaters. The apparatus includes at least one optical amplifier for amplifying input signal light and a narrow bandwidth optical filter for removing amplified spontaneous emission (ASE) light generated at the optical amplifier. A gain detector is provided to detect the gain of the optical amplifier and an ASE optical power detector detects an optical power of the ASE light generated at the optical amplifier. The apparatus includes a splitter for splitting light entering into the narrow bandwidth optical filter and a local oscillator for generating local light having a wavelength displaced from a wavelength of the input signal light. The light split by the splitter is coupled with the local light generated by the local oscillator. An optical power detector makes a heterodyne detection of the optical power of the coupled light. An electrical band-pass filter extracts the optical power of the ASE light generated by the optical amplifier from the optical power obtained by the optical power detector. A noise figure calculator calculates the noise figure according to the gain detected by the gain detector and the optical power of the ASE light detected by the ASE optical power detector.

20 Claims, 25 Drawing Sheets

METHOD AND APPARATUS FOR MONITORING NOISE FIGURE OF OPTICAL AMPLIFIER

BACKGROUND OF THE INVENTION

1. Field of the Invention

The present invention relates to a method and an apparatus for monitoring the noise figure of the optical amplifier such as that used in linear repeaters in an optical transmission system formed by cascaded linear repeaters.

2. Description of the Background Art

A conventional linear repeater typically has a configuration as shown in FIG. 1A for a single stage amplification, or a configuration as shown in FIG. 1B for a two-stage amplification.

In the configuration of FIG. 1A, the linear repeater 30a comprises: an optical amplifier 31a formed by a rare earth doped optical fiber amplifier or a semiconductor laser amplifier for receiving and amplifying a signal light with a wavelength $\lambda s$; and a narrow bandwidth optical filter 32 with a central transmission wavelength $\lambda c,r$ equal to the wavelength $\lambda s$ of the entered signal light, for removing amplified spontaneous emission (ASE) light generated at the optical amplifier 31a. In the configuration of FIG. 1B, the configuration of FIG. 1A is further equipped with an additional optical amplifier 31b, similar to the optical amplifier 31a, which is provided on an output side of the narrow bandwidth optical filter 32.

A conventional optical transmission system formed by cascaded linear repeaters typically has a configuration as shown in FIG. 2, in which the signal light outputted from the optical sender 41 is transmitted through a first optical fiber transmission line $42_0$ at which the signal light is attenuated at a loss $L_0$ and entered into a first linear repeater $30_1$ at which the signal light is amplified at a gain $G_1$ and then outputted to a next optical fiber transmission line $42_1$, and so on. Eventually, the transmitted signal light is received by an optical receiver 43 from the n-th linear repeater $30_n$ through the n-th optical fiber transmission line $42_n$.

In this configuration of FIG. 2, each of the second and subsequent linear repeaters $30_2$ to $30_n$ amplifies the ASE light propagated within the transmission bandwidth of the preceding narrow bandwidth optical filters as well, such that the optical intensity of the ASE light is sequentially accumulated. In the following, the ASE light generated at each linear repeater will be referred as the generated ASE light, while the ASE light entering into each linear repeater along with the signal light will be referred as the propagating ASE light, in order to distinguish them from each other.

A conventional noise figure monitoring apparatus for a linear repeater has a configuration as shown in FIG. 3, which generally comprises a gain detector 50 and an ASE optical power detector 60, both of which are connected with input and output sides of a linear repeater 30 such as that shown in FIG. 1A or FIG. 1B.

The gain detector 50 comprises: splitters 51a and 52a for splitting the lights entering into the linear repeater 30; an optical receiver 53a for detecting an optical power $P_{s,in}$ of the lights split by the splitter 52a; splitters 51b and 52b for splitting the lights outputted from the linear repeater 30; and an optical receiver 53b for detecting an optical power $P_{s,out}$ of the lights split by the splitter 52b.

An input side of the ASE optical power detector 60 comprises: the splitters 51a and 52a which are shared with the gain detector 50; a signal light polarization detector 61a for detecting a polarization state of the signal light split by the splitter 52a; a polarization controller 62a for converting the polarization state of the signal light into a linear polarization along a prescribed polarization direction; a driver 63a for setting the polarization direction for the signal light to be linearly polarized at the polarization controller 62a; a polarizer 64a for removing the linearly polarized signal light from an output of the polarization controller 62a; a narrow bandwidth optical filter 65a for extracting the ASE light from the output of the polarizer 64a; and an optical receiver 66a for detecting an optical power $P_{ASE,in}$ of the ASE light extracted at the narrow bandwidth optical filter 65a.

Similarly, the output side of the ASE optical power detector 60 comprises: the splitters 51b and 52b which are shared with the gain detector 50; signal light polarization detector 61b for detecting a polarization state of the signal light split by the splitter 52b; a polarization controller 62b for converting the polarization state of the signal light into a linear polarization along a prescribed polarization direction; a driver 63b for setting the polarization direction for the signal light to be linearly polarized at the polarization controller 62b; a polarizer 64b for removing the linearly polarized signal light from an output of the polarization controller 62b; a narrow bandwidth optical filter 65b for extracting the ASE light from the output of the polarizer 64b; and an optical receiver 66b for detecting an optical power $P_{ASE,out}$ of the ASE light extracted at the narrow bandwidth optical filter 65b.

Here, the outputs of the polarizers 64a and 64b are tile ASE lights having no specific polarization direction and the optical power reduced in half. Also, the central transmission wavelength $\lambda c,c$ used in the narrow bandwidth optical filters 65a and 65b is set equal to the wavelength $\lambda s$ of the input signal light.

The spectra of the signal light and the propagating ASE light at the point A on an input side of the splitter 51a in the configuration of FIG. 3 appear as shown in FIG. 4A, in which the propagating ASE light is confined within the transmission bandwidth of a narrow bandwidth optical filter of an immediately preceding linear repeater. The splitter 51a splits a small fraction of such entering lights while transmitting a majority of the entering lights to the linear repeater 30. The linear repeater 30 limits the bandwidth of the generated ASE light by a narrow bandwidth optical filter 32 provided therein to remove the generated ASE light outside of this transmission bandwidth. Here, the central transmission wavelength of the narrow bandwidth optical filter 32 is set equal to the wavelength $\lambda s$ of the entering signal light, so that the amplified signal light and propagating ASE light are transmitted through the linear repeater 30.

In a case the linear repeater 30 is of a single amplification type shown in FIG. 1A, the output of the linear repeater 30 contains the signal light and the propagating ASE light and generated ASE light which are within the transmission bandwidth of the narrow bandwidth optical filter 32 provided therein. In a case the linear repeater 30 is of a two-stage amplification type shown in FIG. 1B, the output of the linear repeater 30 is the output of the single amplification type linear repeater further amplified by the additional optical amplifier 31b.

The spectra of the signal light, the propagating ASE light, and the generated ASE light at the point D on an input side of the splitter 51b in the configuration of FIG. 3 appear as shown in FIG. 4B. The splitter 51b splits a small fraction of such entering lights while transmitting a majority of the entering lights to the optical fiber transmission line.

The lights split at the splitter 51a are further split into two at the splitter 52a and one of the split lights is received at the optical receiver 53a. The optical power of the received light at the optical receiver 53a is that of the signal light reached to the optical receiver 53a through the splitters 51a and 52a as can be seen in FIG. 4A. Therefore, the input signal optical power $P_{s,in}$ at an input terminal of the linear repeater 30 can be obtained by adding the signal light loss from the point A to the optical receiver 53a to the optical power of the received light at the optical receiver 53a.

Similarly, the lights split at the splitter 51b are further split into two at the splitter 52b and one of the split lights is received at the optical receiver 53b. The optical power of the received light at the optical receiver 53b is that of the signal light reached to the optical receiver 53b through the splitters 51b and 52b as can be seen in FIG. 4B. Therefore, the output signal optical power $P_{s,out}$ at an output terminal of the linear repeater 30 can be obtained by adding the signal light loss from the point D to the optical receiver 53b to the optical power of the received light at the optical receiver 53b.

On the other hand, the other one of the lights split at the splitter 52a is entered into the signal light polarization detector 61a at which the polarization state of the signal light is detected, and then entered into the polarization controller 62a at which it is converted into the linearly polarized light, along the polarization direction set by the driver 63a which is to be removed by the polarizer 64a. Then, at the polarizer 64a, the signal light is almost completely removed, while the optical power of the propagating ASE light having no specific polarization direction is reduced in half. Then, at the narrow bandwidth optical filter 65a, the output of the polarizer 64a within the transmission bandwidth $\Delta v$ is extracted, and received by the optical receiver 66a. The optical power of the received light at the optical receiver 66a is that of the propagating ASE light transmitted through the splitter 51a to the narrow bandwidth optical filter 65a. Consequently, the propagating ASE optical power $P_{ASE,in}$ at the input terminal of the linear repeater 30 can be obtained by adding the transmission loss from the point A to the optical receiver 66a to the optical power of the received light at the optical receiver 66a.

Similarly, the other one of the lights split at the splitter 52b is entered into the signal light polarization detector 61b at which the polarization state of the signal light is detected, and then entered into the polarization controller 62b at which it is converted into the linearly polarized light, along the polarization direction set by the driver 63b which is to be removed by the polarizer 64b. Then, at the polarizer 64b, the signal light is almost completely removed, while the optical power of the propagating ASE light having no specific polarization direction is reduced in half. Then, at the narrow bandwidth optical filter 65b, the output of the polarizer 64b within the transmission bandwidth $\Delta v$ is extracted, and received by the optical receiver 66b. The spectra of the signal light, the propagating ASE light, and the generated ASE light at the point E on an input side of the optical receiver 66b in the configuration of FIG. 3 appear as shown in FIG. 4C, such that the optical power of the received light at the optical receiver 66b is that of the propagating ASE light and the generated ASE light reached to the optical receiver 66b through the splitter 51b to the narrow bandwidth optical filter 65b. Consequently, a total ASE optical power $P_{ASE,tot}$ at the output terminal of the linear repeater 30 can be obtained by adding the transmission loss from the point D to the optical receiver 66b to the optical power of the received light at the optical receiver 66b.

Here, for the sake of the simplicity, the signal light excess loss due to the other optical components such as the splitters provided on the transmission line or the optical isolators omitted in FIG. 3 is assumed to be zero.

Now, the noise figure F of the linear repeater 30 can be expressed by the following equation (1):

$$F = P_{ASE}/(h \cdot v \cdot \Delta v \cdot G) + 1/G \qquad (1)$$

where h is the Planck constant, v is an average frequency of the ASE light, G is a gain of the linear repeater 30, and $P_{ASE}$ is the optical power of the generated ASE light within the bandwidth $\Delta v$ which is generated by the linear repeater 30.

Here, the gain G of the linear repeater 30 can be obtained from the input signal optical power $P_{s,in}$ at the input terminal of the linear repeater 30 that can be determined from the optical power of the received light at the optical receiver 53a, and the output signal optical power $P_{s,out}$ at the output terminal of the linear repeater 30 that can be determined from the optical power of the received light at the optical receiver 53b, according to the following equation (2).

$$G = P_{s,out}/P_{s,in} \qquad (2)$$

Also, the generated ASE optical power $P_{ASE}$ can be expressed in terms of the propagating ASE optical power $P_{ASE,prop}$ within the bandwidth $\Delta v$ at the output terminal of the linear repeater 30 and the total ASE optical power $P_{ASE,tot}$ within the bandwidth $\Delta v$ at the output terminal of the linear repeater 30 that can be determined from the optical power of the received light at the optical receiver 66b, by the following equation (3).

$$P_{ASE} = P_{ASE,tot} - P_{ASE,prop} \qquad (3)$$

Here, the propagating ASE optical power $P_{ASE,prop}$ within the bandwidth $\Delta v$ at the output terminal of the linear repeater 30 cannot be detected by itself, but it can be obtained from the gain G of the linear repeater 30 and the propagating ASE optical power $P_{ASE,in}$ within the bandwidth $\Delta v$ at the input terminal of the linear repeater 30 that can be determined from the optical power of the received light at the optical receiver 66a, according to the following equation (4).

$$P_{ASE,prop} = G \cdot P_{ASE,in} \qquad (4)$$

Thus, by substituting the propagating ASE optical power $P_{ASE,prop}$ obtained from this equation (4) into the above equation (3), the generated ASE optical power $P_{ASE}$ of the linear repeater 30 can be calculated, and by substituting the gain G and the generated ASE optical power $P_{ASE}$ obtained from the above equations (2) and (3) into the above equation (1), the noise figure F of the linear repeater 30 can be calculated.

In other words, the conventional noise figure monitoring apparatus has a configuration in which the input signal optical power $P_{s,in}$, the output signal optical power $P_{s,out}$, the propagating ASE optical power $P_{ASE,in}$, and the total ASE optical power $P_{ASE,tot}$ are measured by using the gain detector 50 and the ASE optical power detector 60, and the noise figure of the linear repeater 30 is calculated from the gain G of the linear repeater 30 and the generated ASE optical power $P_{ASE}$ determined from these measured quantities.

Consequently, such a conventional noise figure monitoring apparatus requires to provide the gain detector 50 and the ASE optical power detector 60 on both of the input side and the output side of the linear repeater 30, and this requirement in turn causes the size and the cost of the noise figure monitoring apparatus to be considerably large.

Now, in an optical amplifier called the erbium doped fiber amplifier (EDFA) for realizing the amplification by pumping the erbium doped fiber with the laser or others, in general, the majority of the noise energy obtained at the output terminal can be considered as due to the beat noise between the shot noise of the entered signal light and the ASE light entered along with the signal light.

An example of a conventional noise figure monitoring apparatus for such an EDFA has a configuration as shown in FIG. 5. In this configuration of FIG. 5, an output of a laser diode 91 of a distributed feedback type which functions as a signal light source is transmitted to the first stage optical amplifier (EDFA) 93 through a transmission fiber 92$_1$, and an output of this first stage optical amplifier 93 is transmitted through the band-pass optical filter (BPF) 94 and a transmission fiber 92$_2$ to a second stage optical amplifier 95 whose noise figure is to be monitored and whose output is connected to a noise figure measurement unit 96.

In this second stage optical amplifier 95, the input terminal is connected with a fiber coupler 98 through an optical isolator 97, while the output terminal is connected with the fiber coupler 98 through an erbium doped fiber 99. Here, the erbium doped fiber 99 is formed by doping the aluminum compound $Al_2O_3$ in addition to the erbium. The fiber coupler 98 has one of its inputs optically coupled with a laser diode 100, while the erbium doped fiber 99 is optically coupled with the noise figure measurement unit 96 through the output terminal.

The noise figure measurement unit 96 has a photo-diode 102$_1$ which is optically coupled with the erbium doped fiber 99 of the second stage optical amplifier 95 through an optical filter (OF) 101 on one hand and electrically connected with one input of a noise figure calculation unit 103. The output terminal of the erbium doped fiber 99 of the second stage optical amplifier 95 is connected with a fiber monitor 105 through an optical isolator 104, and one output of the fiber monitor 105 is connected with an output terminal through a band-pass optical filter (BPF) 106$_1$ while another output of the fiber monitor 105 is optically coupled with a photo-diode 102$_2$ through a band-pass optical filter (BPF) 106$_2$ which is electrically connected with another input of the noise figure calculation unit 103.

Here, each of the band-pass optical filters 106$_1$ and 106$_2$ is formed by the vapor deposition of the dielectric multi-layer on a glass plate, while each of the photo-diodes 102$_1$ and 102$_2$ is formed by InGaAs semiconductor suitable for a long wavelength bandwidth.

In the noise figure calculation unit 103, the outputs of the photo-diodes 102$_1$ and 102$_2$ are A/D converted by A/D converters 107$_1$ and 107$_2$ and entered into a digital processing circuit 108, while an output of the digital processing circuit 108 is D/A converted by D/A converter 109 and outputted as an approximated noise figure $F^*_{pre}$ to be described in detail below.

In this noise figure monitoring apparatus of FIG. 5, the signal light of a prescribed wavelength $\lambda s=1.5515$ μm outputted from the laser diode 91 is attenuated through the transmission fiber 92$_1$, and given to the optical amplifier 93 at a prescribed level of −15 dBm. The optical amplifier 93 then amplifies the received signal light at the prescribed gain of 24.9 dB. The band-pass optical filter 94 has a central wavelength equal to the wavelength $\lambda s$ of the signal light, and its transmission half bandwidth is set to 2.7 nm which is appropriate for transmitting a major energy of the signal light, such that optical amplifier 93 reduces the ASE light component from the amplified signal received from the optical amplifier 93 in order to suppress the beat noise between the ASE light and the signal light and then outputs the resulting signal to the optical amplifier 95 through the transmission fiber 92$_2$.

In the optical amplifier 95, the signal light given through the optical isolator 97 is combined with as pumping light of a prescribed wavelength 0.98 μm outputted from the laser diode 100 at the fiber coupler 98 and transmitted to the erbium doped fiber 99 which functions as a gain medium, along with the propagating ASE light component also given through the optical isolator 94, as shown in FIG. 6A. Here, the optical power on the vertical axis is normalized by the signal optical power obtained at an output of the erbium doped fiber 99.

The erbium doped fiber 99 amplifies the signal light by being pumped by the pumping light, and outputs the amplified signal light and propagating ASE light along with the generated ASE light which is newly generated at the erbium doped fiber 99 itself, as shown in FIG. 6B.

In the noise figure measurement unit 96, the optical filter 101 has a high wavelength range transmission characteristic, so as to remove the component for the wavelength 0.98 μm of the pumping light scattered from the spontaneous emission light which is outputted from the erbium doped fiber 99.

Then, the photo-diode 102$_1$ applies the photo-electric conversion to the ASE light obtained by the optical filter 101 in this manner, and supplies the obtained electrical signal corresponding to the optical power of the ASE light into the noise figure calculation unit 103.

On the other hand, the input terminal of the optical isolator 104 receives the signal light, propagating ASE light, and generated ASE light from the erbium doped fiber 99 as shown in FIG. 6B, along with the above described pumping light. Here, however, a part of the components of the pumping light are already absorbed at the erbium doped fiber 99, and in addition, almost the entire components of the pumping light are absorbed at the optical isolator 104. Consequently, the fiber monitor 105 splits the signal light and the propagating and generated ASE lights at a prescribed ratio of 20:1.

The optical filter 106$_1$ has a bandwidth transmission characteristic as shown in FIG. 7A in which the central transmission wavelength is set equal to the wavelength $\lambda s=1.5515$ μm of the signal light, so as to suppress the propagating and generated ASE light components and transmit the signal light in its output.

The optical filter 106$_2$ has a bandwidth transmission characteristic as shown in FIG. 7B in which the central transmission wavelength is set equal to a wavelength $\lambda c2=1.542$ μm<$\lambda s$ in a vicinity of the wavelength $\lambda s$ of the signal light, with the transmission half bandwidth equal to 1.5 nm, so as to suppress the signal light and transmit the generated ASE light components in its output, as shown in FIG. 6C. Here, the propagating ASE light is ignored as it is smaller than the generated ASE light as much as about 40 dB in this transmission bandwidth of the optical filter 106$_2$ as shown in FIG. 6B.

The photo-diode 102$_2$ applies the photo-electric conversion to the optical power $P_{ASE}(\lambda c2)$ of the generated ASE light obtained by the optical filter 106$_2$ in this manner, and supplies the obtained electrical signal corresponding to the optical power of the generated ASE light into the noise figure calculation unit 103.

In the noise figure calculation unit 103, the optical power of the ASE light obtained through the photo-diode 102$_1$ is A/D converted by the A/D converter 107$_1$ and supplied into the digital processing circuit 108. The digital processing circuit 108 then calculates the gain G>>1 of the erbium doped fiber 99 by using the known procedures such as those disclosed in Japanese Patent Application Laid Open No. 4-356984 (1992).

Now, in general, the noise figure F is given by the equation (1) described above, but the approximated expression of the following equation (5) holds for the generated ASE optical power for a case of the wavelength $\lambda c2$ in a vicinity of the wavelength $\lambda s$, by using a predetermined constant C<0.

$$P_{ASE}(\lambda s) \approx P_{ASE}(\lambda c2) \cdot 10^{(-c/10)} \quad (5)$$

When this approximated expression is substituted into the above equation (1) and the logarithm of both sides is taken, the following expression (6) for the approximated noise figure F* in dB unit can be obtained.

$$F^* \approx F^*_{pre} \equiv 10 \cdot \log \left\{ \frac{10^{(-c/10)} P_{ASE}(\lambda c2)}{h \cdot v \cdot \Delta v \cdot G} + \frac{1}{G} \right\} = \quad (6)$$

$$10 \cdot \log \left\{ K_1 \cdot \frac{P_{ASE}(\lambda c2)}{G} + \frac{1}{G} \right\}$$

where $K_1 \equiv 10^{(-c/10)}/h \cdot v \cdot \Delta v$, and the value of $P_{ASE}(\lambda c2)$ is obtained by A/D converting the output of the photo-diode $102_2$ at the A/D converter $107_2$.

The approximated noise figure $F^*_{pre}$ in dB unit so calculated is plotted as a curve C1 in FIG. 8, which has an error $\Delta P$ with respect to the theoretical value of the noise figure F* in dB unit obtained according to the above equation (1) and plotted as a curve C2 in FIG. 8, due to the saturation characteristic of the gain G characteristic to the erbium doped fiber 99 and the level variation of the generated ASE light with respect to the variation of the gain G associated with that saturation characteristic, where this error $\Delta P$ varies according to the input signal optical power.

From the above equations (1) and (6), this error $\Delta P$ can be expressed by the following equation (7) with the ASE powers in dB unit $P_{ASE}^*(\lambda c2)$ and $P_{ASE}^*(\lambda s)$.

$$\Delta P = F^*_{pre} - F^* = P_{ASE}^*(\lambda c2) - P_{ASE}^*(\lambda s) \quad (7)$$

which varies according to the gain G* in dB unit as plotted as a curve C3 in FIG. 9.

Now, in such a conventional noise figure monitoring apparatus for the erbium doped fiber amplifier, despite of the fact that the calculations carried out in the noise figure calculation unit 103 are quite complicated as in the above equation (6), the error $\Delta P$ contained in the approximated noise figure $F^*_{pre}$ given by the above equation (7) has been regarded as a constant value C as indicated in FIG. 9 according to the approximation of the above equation (5), such that the dependency of the approximated noise figure $F^*_{pre}$ on the gain G* as indicated in FIG. 9 has effectively been ignored. As a result, there has been cases in which the approximated noise figure $F^*_{pre}$ takes quite large value in accordance with the variation of the input signal optical power.

Such a variation of the error $\Delta P$ with respect to the variation of the gain G* can be reduced by setting the central wavelength $\lambda c2$ of the transmission bandwidth of the optical filter $106_2$ to be very close to the wavelength $\lambda s$ of the signal light. However, this provision has been very often impractical due to the technological and economical limitations, as it requires to set up the selective transmittivity of the optical filters $106_1$ and $106_2$ extremely sharply in order to realize the level difference greater than a prescribed lower limit between the signal light and the generated ASE light at the outputs of these optical filters $106_1$ and $106_2$.

SUMMARY OF THE INVENTION

It is therefore an object of the present invention to provide a method and an apparatus for monitoring the noise figure of the optical amplifier, capable of reducing the size and the cost of the apparatus by simplifying its configuration.

It is another object of the present invention to provide a method and an apparatus for monitoring the noise figure of the optical amplifier, capable of simplifying the calculations required in obtaining the noise figure, while improving the accuracy of the calculated noise figure.

According to one aspect of the present invention there is provided an apparatus for monitoring a noise figure of a linear repeater including at least one optical amplifier for amplifying input signal light and at least one narrow bandwidth optical filter for removing amplified spontaneous emission (ASE) light generated at the optical amplifier, the apparatus comprising: gain detector means for detecting a gain of the optical amplifier; ASE optical power detector means for detecting an optical power of the ASE light generated at the optical amplifier, including: splitter means for splitting lights entering into the narrow bandwidth optical filter; optical filter means having a central transmission wavelength displaced from a wavelength of the input signal light, for extracting the ASE light generated at the optical amplifier from the lights split by the splitter means; and optical power detection means for detecting the optical power of the ASE light extracted by the optical filter means; and noise figure calculation means for calculating the noise figure according to the gain detected by the gain detector means and the optical power of the ASE light detected by the ASE optical power detector means.

According to another aspect of the present invention there is provided an apparatus for monitoring a noise figure of a linear repeater including at least one optical amplifier for amplifying input signal light and a narrow bandwidth optical filter for removing amplified spontaneous emission (ASE) light generated at the optical amplifier, the apparatus comprising: gain detector means for detecting a gain of the optical amplifier; ASE optical power detector means for detecting an optical power of the ASE light generated at the optical amplifier, including: splitter means for splitting lights entering into the narrow bandwidth optical filter; local oscillator means for generating local light having a wavelength displaced from a wavelength of the input signal light; coupler means for coupling the lights split by the splitter means with the local light generated by the local oscillator means; optical power detection means for making a heterodyne detection of the optical power of the lights coupled by the coupler means; and electrical band-pass filter means for extracting the optical power of the ASE light generated at the optical amplifier from the optical power obtained by the optical power detection means; and noise figure calculation means for calculating the noise figure according to the gain detected by the gain detector means and the optical power of the ASE light detected by the ASE optical power detector means.

According to another aspect of the present invention there is provided a method for monitoring a noise figure of a linear repeater including at least one optical amplifier for amplifying input signal light and at least one narrow bandwidth optical filter for removing amplified spontaneous emission (ASE) light generated at the optical amplifier, the method comprising the steps of: (a) detecting a gain of the optical amplifier; (b) detecting an optical power of the ASE light generated at the optical amplifier in a vicinity of a central transmission wavelength displaced from a wavelength of the input signal light; and (c) calculating the noise figure according to the gain detected at the step (a) and the optical power of the ASE light detected at the step (b), by approximating the optical power of the ASE light generated by the optical amplifier at an output side of the linear repeater in a vicinity of the wavelength of the input signal light by the optical power of the ASE light generated by the optical amplifier detected at the step (b) in a vicinity of the central transmission wavelength.

According to another aspect of the present invention there is provided a method of monitoring a noise figure for an optical amplifier for amplifying input signal light, comprising the steps of: (a) measuring a gain $G^*$ in dB unit of the optical amplifier; (b) measuring an optical power $P^*_{ASE}$ in dB unit of an amplified spontaneous emission (ASE) light generated by the optical amplifier at a wavelength $\lambda c2$ displaced from a wavelength $\lambda s$ of the input signal light; and (c) calculating an approximate noise figure $F^*_{apr}$ in dB unit by substituting the gain $G^*$ measured at the step (a) and the optical power $P^*_{ASE}$ measured at the step (b) into an equation: $F^*_{apr} \approx P^*_{ASE}*(\lambda c2)+K_2-K_3 \cdot G^*$ where $K_2$ and $K_3$ are constant coefficients.

According to another aspect of the present invention there is provided an apparatus for monitoring a noise figure for an optical amplifier for amplifying input signal light, comprising: gain detector means for measuring a gain $G^*$ in dB unit of the optical amplifier; ASE optical power detector means for measuring an optical power $P^*_{ASE}$ in dB unit of an amplified spontaneous emission (ASE) light generated by the optical amplifier at a wavelength $\lambda c2$ displaced from a wavelength $\lambda s$ of the input signal light; and processing means for calculating an approximate noise figure $F^*_{apr}$ in dB unit by substituting the gain $G^*$ measured by the gain detector means and the optical power $P^*_{ASE}$ measured by the ASE optical power detector means into an equation: $F^*_{apr} \approx P^*_{ASE}*(\lambda c2)+K_2-K_3 \cdot G^*$ where $K_2$ and $K_3$ are constant coefficients determined in advance from known sets of the noise figures, the gain, and the optical power of the ASE light.

Other features and advantages of the present invention will become apparent from the following description taken in conjunction with the accompanying drawings.

DETAILED DESCRIPTION OF THE PREFERRED EMBODIMENTS

Figure 10:
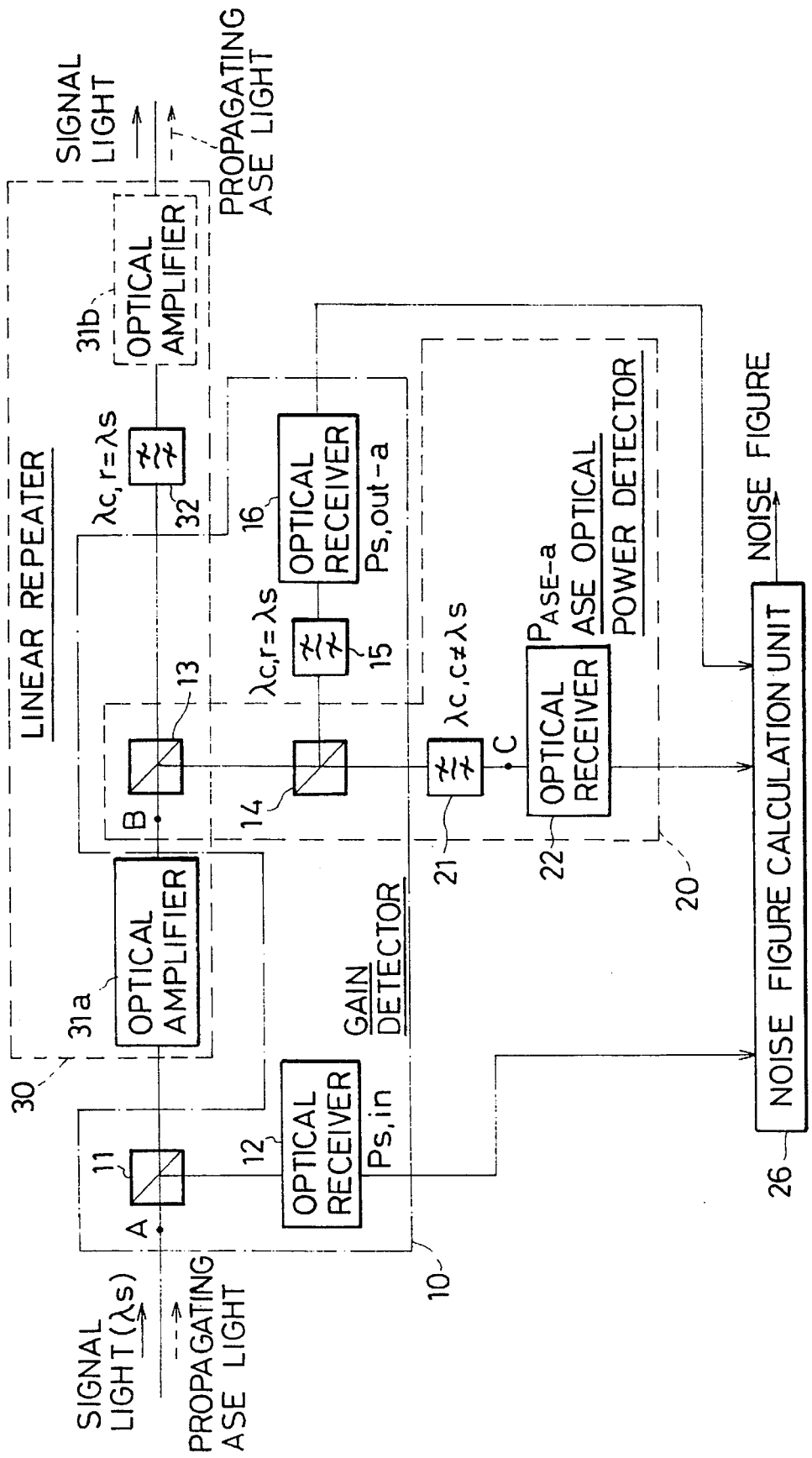
FIG. 10 is a block diagram of a first embodiment of a noise figure monitoring apparatus for an optical amplifier according to the present invention.

Referring now to FIG. 10, a first embodiment of a method and an apparatus for noise figure monitoring according to the present invention will be described in detail.

In this configuration of FIG. 10, the apparatus generally comprises: a two-stage linear repeater 30 including optical amplifiers 31a and 31b on input and output sides for amplifying the signal light with the wavelength λs, and a narrow bandwidth optical filter 32 connected between the optical amplifiers 31a and 31b for removing the ASE light generated at the optical amplifier 31a, which has a central transmission wavelength λc,r equal to the wavelength λs of the entered signal light; a gain detector 10 connected on an input side of the linear repeater 30 as well as between the optical amplifier 31a and the narrow bandwidth optical filter 32 of the linear repeater 30, for measuring the gain of the optical amplifier 31a; an ASE optical power detector 20 connected between the optical amplifier 31a and the narrow bandwidth optical filter 32 of the linear repeater 30, for measuring the optical power of the ASE light generated at the optical amplifier 31a; and a noise figure calculation unit 26 connected with the gain detector 20 and the ASE optical power detector 20, for calculating the noise figure of the optical amplifier 31a according to the gain and the ASE optical power measured by the gain detector 10 and the ASE optical power detector 20.

Figure 1A:
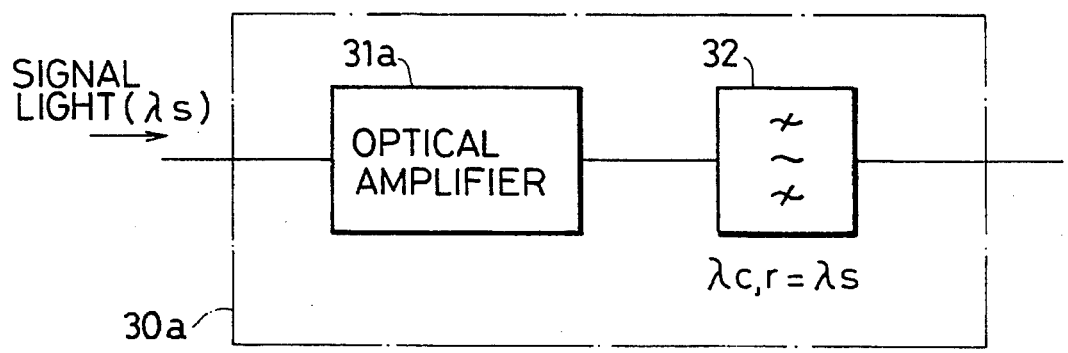
FIGS. 1A and 1B are block diagrams of conventional linear repeaters of single stage and two-stage amplification types, respectively.
Figure 1B:
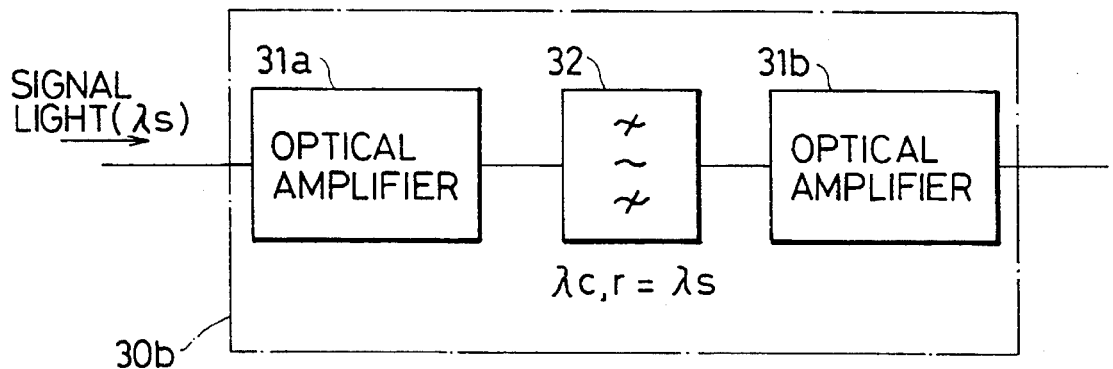

This first embodiment of FIG. 10 shows an exemplary case of using the two-stage linear repeater 30 substantially similar to that shown in FIG. 1B, although this embodiment is equally applicable to a linear repeater of any desired number of amplification stages, including a single stage amplification type. In general, a case of a multi-stage amplification type linear repeater can be handled similarly by connecting the gain detector 10 on an input side of the linear repeater as well as in front of a first narrow bandwidth optical filter of the linear repeater, and connecting the ASE optical power detector 20 in front of the first narrow bandwidth optical filter of the linear repeater, just as in the configuration of FIG. 10.

The gain detector 10 comprises: a splitter 11 for splitting the lights entering into the linear repeater 30; an optical receiver 12 for detecting an optical power $P_{s,in}$ of the lights split by the splitter 11; splitters 13 and 14 for splitting the lights outputted from the optical amplifier 31a; a narrow bandwidth optical filter 15 for removing the ASE light generated at the optical amplifier 31a from the lights split by the splitters 13 and 14, which has a central transmission wavelength λc,r equal to the wavelength λs of the entered signal light (λc,r=λs); and an optical receiver 16 for detecting an optical power $P_{s,out-a}$ of the light outputted from the narrow bandwidth optical filter 15.

The ASE optical power detector 20 comprises: the splitters 13 and 14 which are shared with the gain detector 10; a narrow bandwidth optical filter 21 for extracting the ASE light generated at the optical amplifier 31a from the lights split by the splitters 13 and 14, which has a central transmission wavelength λc,c set to be displaced from the wavelength λs of the entered signal light(λc,c≠λs); and an optical receiver 22 for detecting an optical power $P_{ASE-a}$ of the ASE light extracted at the narrow bandwidth optical filter 21.

In the following, for the sake of the simplicity, the signal light excess loss due to the other optical components such as the splitters provided on the transmission line or the optical isolators omitted in FIG. 10 is assumed to be zero.

Figure 11A:
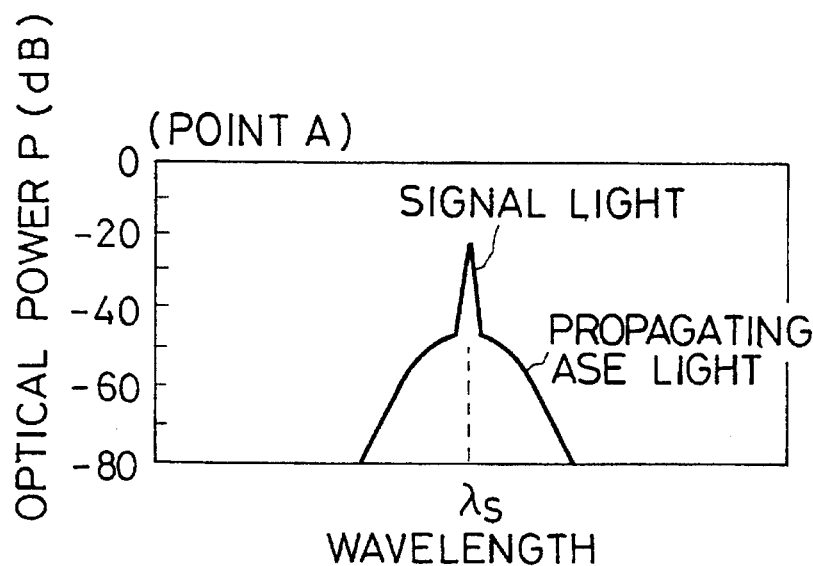
FIGS. 11A, 11B, and 11C are graphs of optical power versus wavelength at points A, B, and C in the apparatus of FIG. 10.

The spectra of the signal light and the propagating ASE light at the point A on an input side of the splitter 11 in the configuration of FIG. 10 appear as shown in FIG. 11A, in which the propagating ASE light is confined within the transmission bandwidth of a narrow bandwidth optical filter of an immediately preceding 11near repeater. The splitter 11 splits a small fraction of such entering lights while transmitting a majority of the entering lights to the linear repeater 30.

The optical power of the received light at the optical receiver 12 is that of the signal light reached to the optical receiver 12 through the splitter 11 as can be seen in FIG. 11A. Therefore, the input signal optical power $P_{s,in}$ at an input terminal of the linear repeater 30 can be obtained by adding the signal light loss from the point A to the optical receiver 12 to the optical power of the received light at the optical receiver 12.

Figure 11B:
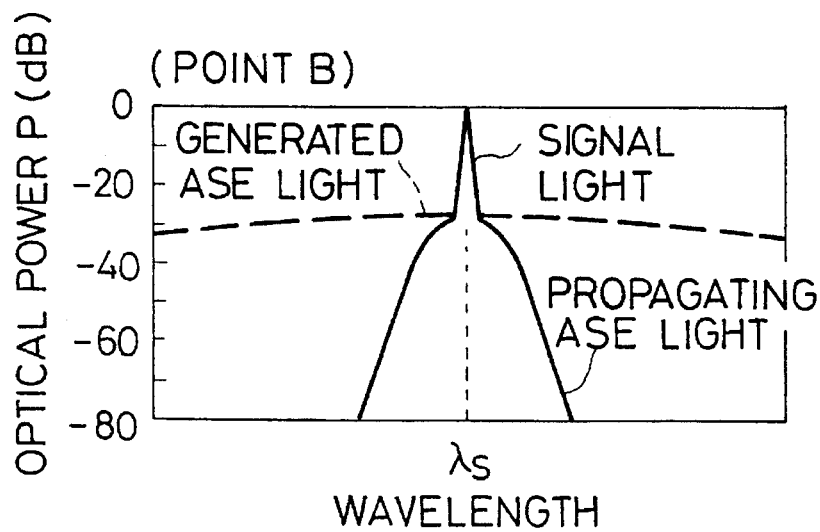

The optical amplifier 31a then amplifies the entered signal light and the propagating ASE light, while also generating the generated ASE light. The spectra of the signal light, the propagating ASE light, and the generated ASE light at the point B on an input side of the splitter 13 in the configuration of FIG. 10 appear as shown in FIG. 11B. The splitter 13 splits a small fraction of such entering lights while transmitting a majority of the entering lights to the narrow bandwidth optical filter 32.

Then, the output of the narrow bandwidth optical filter 32 is amplified and outputted by the optical amplifier 31b to the optical fiber transmission line. In a case of a single stage linear repeater, the output of the narrow bandwidth optical filter 32 is outputted directly to the optical fiber transmission line. Here, the linear repeater 30 limits the bandwidth of the generated ASE light by the narrow bandwidth optical filter 32 which removes the generated ASE light outside of this transmission bandwidth. Since the central transmission wavelength of the narrow bandwidth optical filter 32 is set equal to the wavelength λs of the entering signal light, the amplified signal light and propagating ASE light are transmitted through the linear repeater 30.

The lights split at the splitter 13 are further split into two at the splitter 14 and one of the split lights is entered into the optical receiver 16 through the narrow bandwidth optical filter 15. The optical power of the received light at the optical receiver 16 is that of the signal light reached to the optical receiver 16 through the splitters 13 and 14 as can be seen in FIG. 11B. Therefore, the output signal optical power $P_{s,out-a}$ at an input terminal of the optical amplifier 31a can be obtained by adding the signal light loss from the point B to the optical receiver 16 to the optical power of the received light at the optical receiver 16.

Figure 11C:
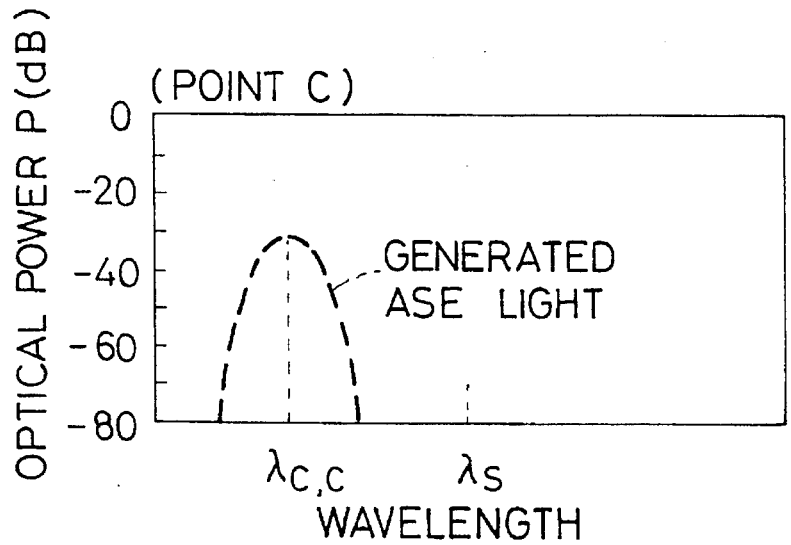

On the other hand, the other one of the lights split at the splitter 14 is entered into the narrow bandwidth optical filter 21. Here, because the central transmission wavelength λc,c of the narrow bandwidth optical filter 21 is set to be displaced from the wavelength λs of the entering signal light, the signal light and the propagating ASE light which are not in a vicinity of this wavelength λc,c are almost completely removed by this narrow bandwidth optical filter 21, such that only the remaining generated ASE light in a vicinity of this wavelength λc,c is extracted and entered into the optical receiver 22. Thus, the spectra of the light at the point C on an input side of the optical receiver 22 in the configuration of FIG. 10 appear as shown in FIG. 11C, which contains only the generated ASE light in a vicinity of the wavelength λc,c.

The optical power of the received light at the optical receiver 22 is that of the generated ASE light transmitted through the splitter 13 to the narrow bandwidth optical filter 21. Here, the generated ASE light is entered into the narrow bandwidth optical filter 21 without any bandwidth limitation, so that by displacing the central transmission wavelength λc,c of the narrow bandwidth optical filter 21 from the wavelength λs of the entering signal light, the optical power of only the generated ASE light can be detected at the optical receiver 22. Consequently, the generated ASE optical power $P_{ASE-a}$ within the transmission bandwidth Δν at the output terminal of the optical amplifier 31a can be obtained by adding the transmission loss from the point B to the optical receiver 22 to the optical power of the received light at the optical receiver 22.

Here, it is to be noted that the generated ASE optical power $P_{ASE}$ at the output terminal of the linear repeater 30 is actually obtained through the narrow bandwidth optical filter 32 with the central transmission frequency λc,r, which is slightly different from the generated ASE optical power $P_{ASE-a}$ obtained through the narrow bandwidth optical filter 21 with the central transmission frequency λc,c.

It is also to be noted that the noise figure of an entire linear repeater is determined by a noise figure of the first stage optical amplifier, so that the noise figure of the linear repeater 30 can be calculated in approximation from the generated ASE optical power $P_{ASE-a}$ within the transmission bandwidth Δν at the output terminal of the optical amplifier 31a and the gain Ga of the optical amplifier 31a.

More specifically, in a case the linear repeater 30 is of a single stage amplification type, the gain Ga of the first stage optical amplifier 31a is identical with the gain G of the linear repeater 30 as a whole, so that the noise figure F of the linear repeater 80 can be calculated by approximating the generated ASE optical power $P_{ASE}$ within the transmission bandwidth by the generated ASE optical power $P_{ASE-a}$ obtained at the optical receiver 22 and using the equation (1) described above.

In a case the linear repeater 30 is of a two-stage amplification type as shown in FIG. 10, the noise figure F of the entire linear repeater 30 can be calculated in approximation as follows.

Namely, in this case, the gain Ga of the optical amplifier 31a can be obtained from the input signal optical power $P_{s,in}$ at the input terminal of the optical amplifier 31a that can be determined from the optical power of the received light at the optical receiver 12, and the output signal optical power $P_{s,out-a}$ at the output terminal of the optical amplifier 31a that can be determined from the optical power of the received light at the optical receiver 16, according to the following equation (8).

$$Ga = P_{s,out-a}/P_{s,in} \qquad (8)$$

Consequently, the approximated noise figure $F_{apr}$ of the linear repeater 30 can be expressed by the following equation (9):

$$F_{apr} = P_{ASE-a}/(h \cdot \nu \cdot \Delta\nu \cdot Ga) + 1/Ga \qquad (9)$$

where h is the Planck constant, and ν is an average frequency of the ASE light.

The noise figure calculation unit 26 carries out these calculations of the above equations (8) and (9) to obtain the approximated noise figure $F_{apr}$ according to the input signal optical power $P_{s,in}$ and the output signal optical power $P_{s,out-a}$ measured at the gain detector 10 and the generated ASE optical power $P_{ASE-a}$ measured at the ASE optical power detector 20.

Here, the difference between the approximated noise figure $F_{apr}$ calculated according to this equation (9) and the true noise figure F calculated according to the above equation (1) is about 0.2 dB at most, which is practically ignorable in most cases.

It is to be noted that, in this first embodiment, it is preferable to displace the central transmission wavelength λc,c of the narrow bandwidth optical filter 21 from the wavelength λs of the signal light for approximately 5 nm.

As described, according to this first embodiment, the sufficiently accurate approximated noise figure can be obtained for the optical amplifier by measuring the approximated ASE optical power in the optical amplifier output at the wavelength displaced from the wavelength λs of the signal light and calculating the approximated noise figure from the approximated ASE optical power and the gain of the optical amplifier measured separately, so that a configuration of the noise figure monitoring apparatus can be simplified significantly, and therefore the size and the cost of the apparatus can be reduced considerably.

Figure 12:
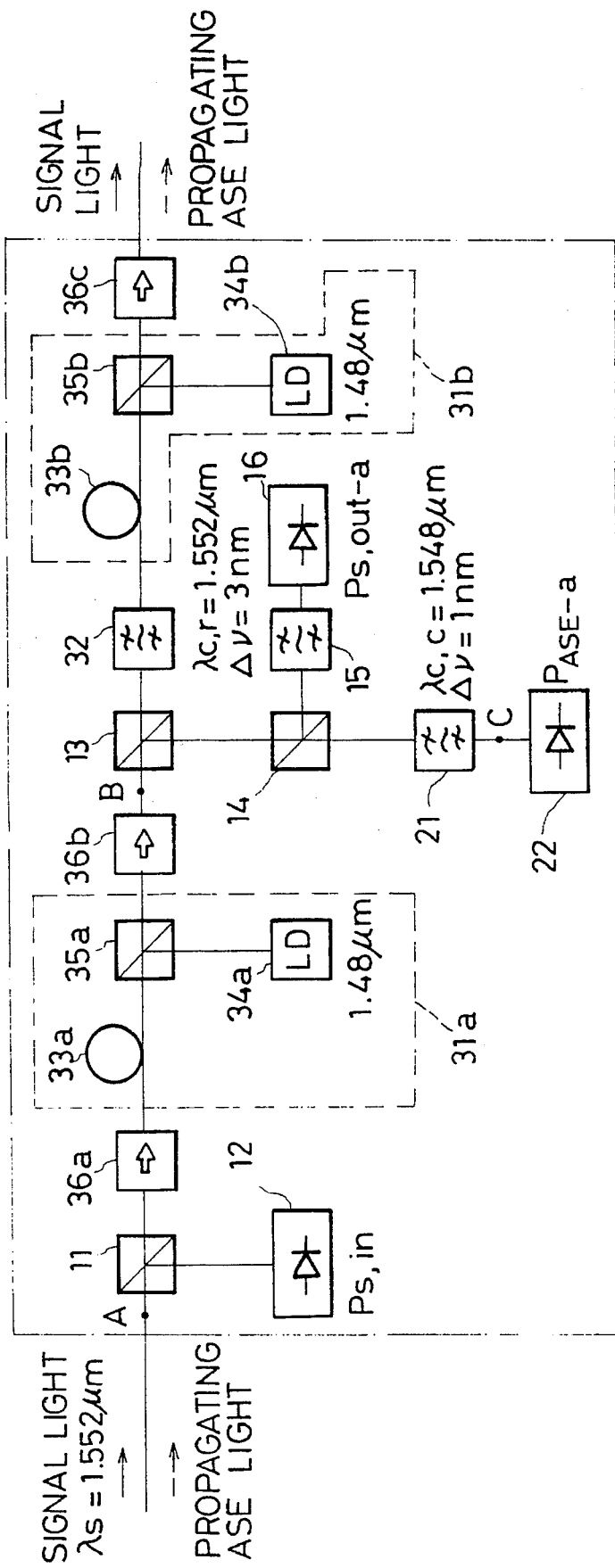
FIG. 12 is a block diagram of one practical implementation of the first embodiment of the noise figure monitoring apparatus.

Referring now to FIG. 12, one specific implementation of the first embodiment Just described will be described in detail.

In this implementation of FIG. 12, the wavelength λs of the entered signal light is set to 1.552 μm, so that the central transmission wavelength λc,r of the narrow bandwidth optical filter 32 and 15 is also set to 1.552 μm, while their transmission bandwidth Δν is set to 3 nm. On the other hand, the central transmission wavelength λc,c of the narrow bandwidth optical filter 21 is set to 1.548 μm, and its transmission bandwidth is set to 1 nm.

As indicated in FIG. 12, the optical receivers 12, 16 and 22 are provided in forms of photo-diodes, while the optical amplifier 31a (31b) comprises an erbium doped fiber amplifier formed by an erbium doped fiber 33a (33b) for receiving an output of the splitter 11 (the narrow bandwidth optical filter 32), a semiconductor laser (LD) 34a (34b) of 1.48 μm functioning as a pumping light source, and a coupler 35a (35b) for coupling the semiconductor laser 34a (34b) with an output of the erbium doped fiber 33a (33b). In addition, optical isolators 36a, 36b, and 36c are provided between the splitter 11 and the optical amplifier 31a, between the optical amplifier 31a and the splitter 13, and between the optical amplifier 31b and the optical fiber transmission line, respectively, in order to prevent the laser oscillation at the output of the linear repeater 30.

In the following, for the sake of simplicity, the loss at each of the optical isolators, splitters, and couplers at the wavelengths of the signal light and the ASE light is assumed to be equal to 1 dB. In addition, the loss at each of the narrow bandwidth optical filters at the central transmission wavelength is assumed to be equal to 1 dB.

Figure 2:
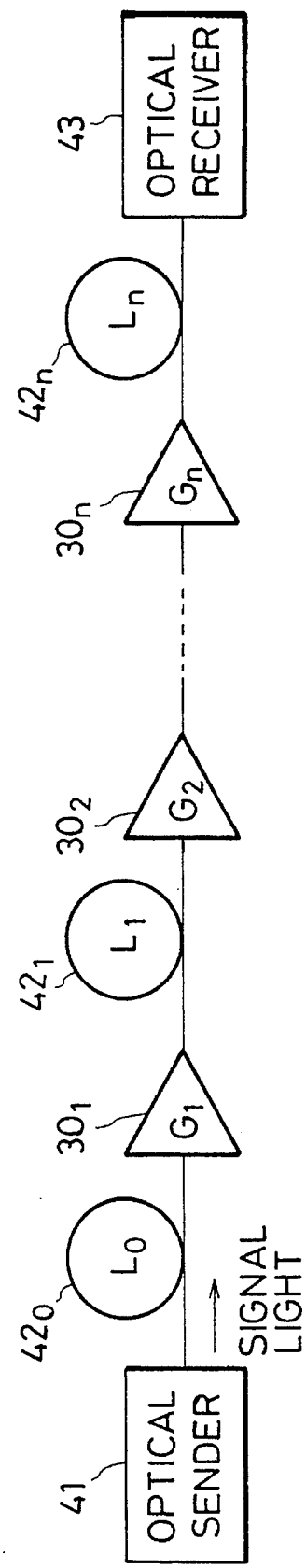
FIG. 2 is a block diagram of a conventional optical transmission system using cascaded linear repeaters.
Figure 3:
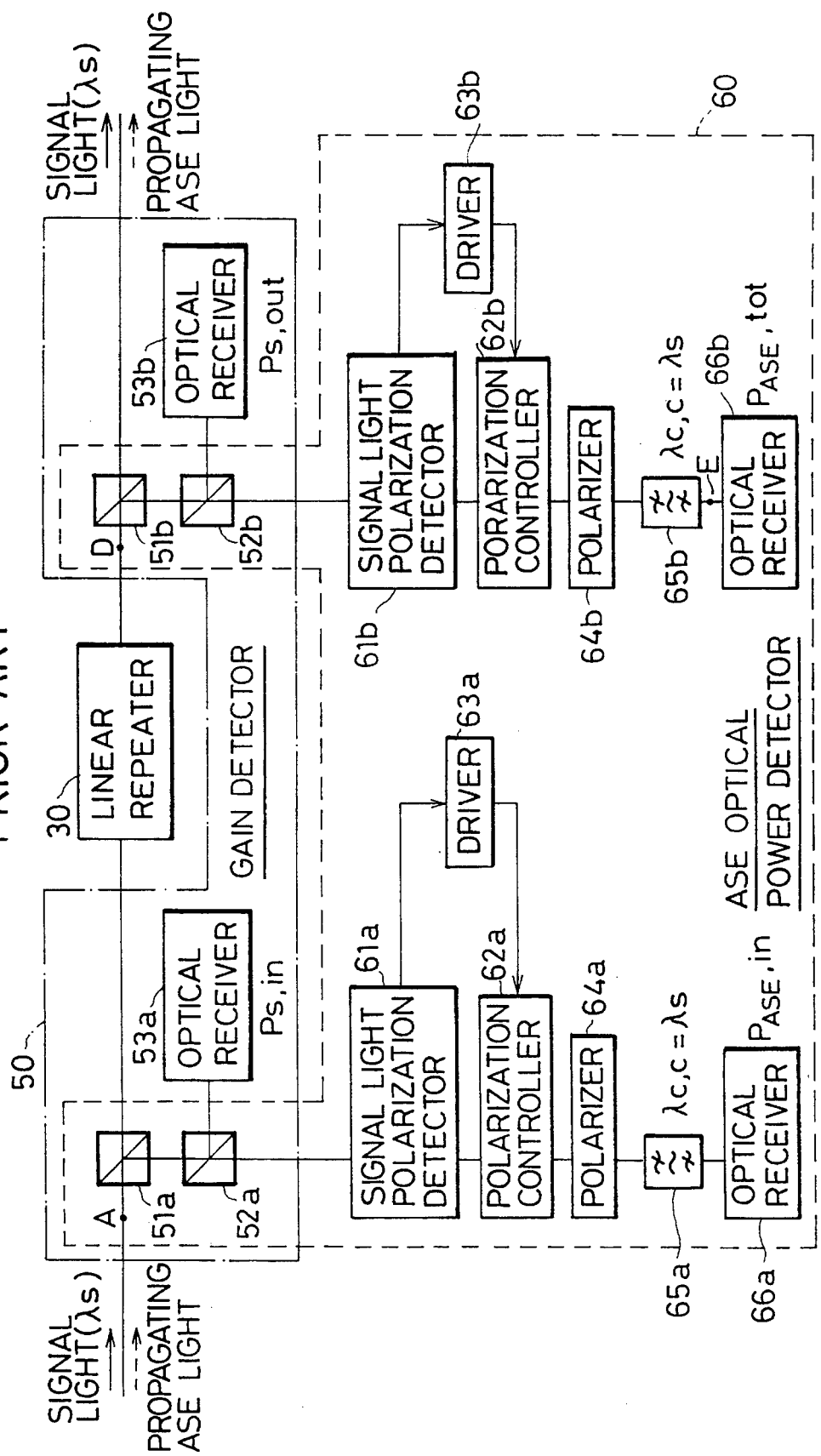
FIG. 3 is a block diagram of a conventional noise figure monitoring apparatus for a linear repeater.
Figure 4A:
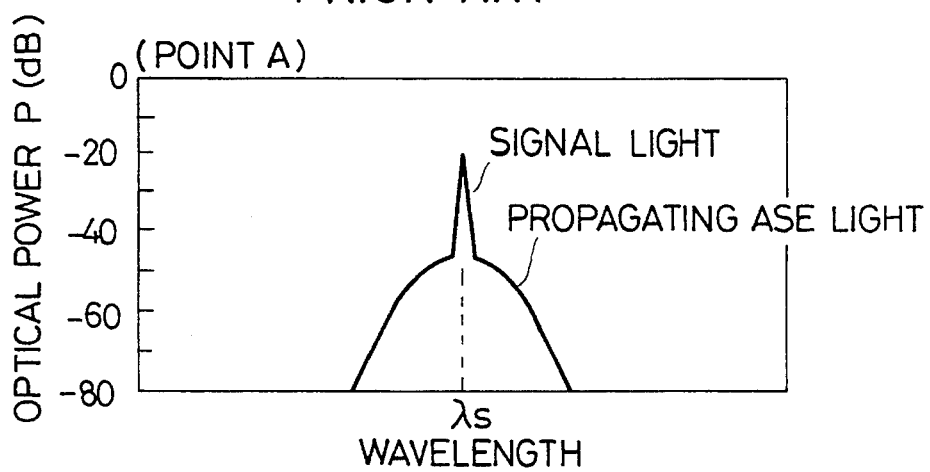
FIGS. 4A, 4B, and 4C are graphs of optical power versus wavelength at points A, D, and E in the apparatus of FIG. 3.
Figure 4B:
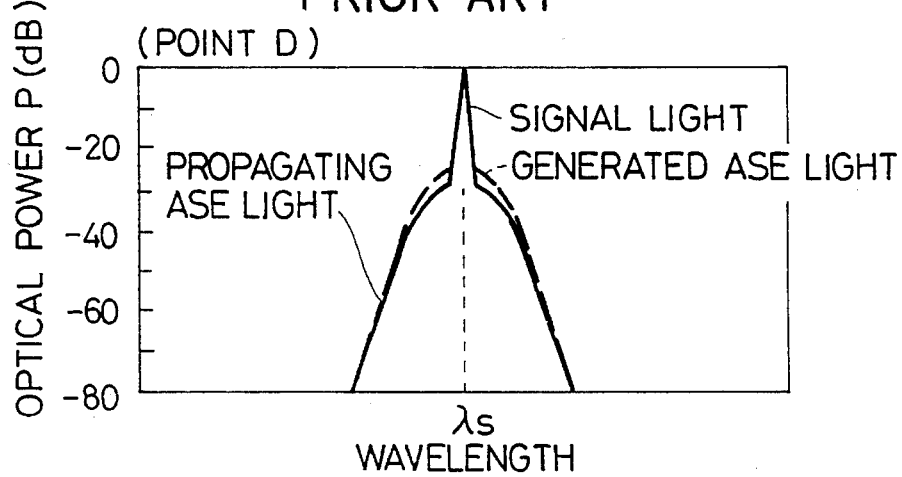
Figure 4C:
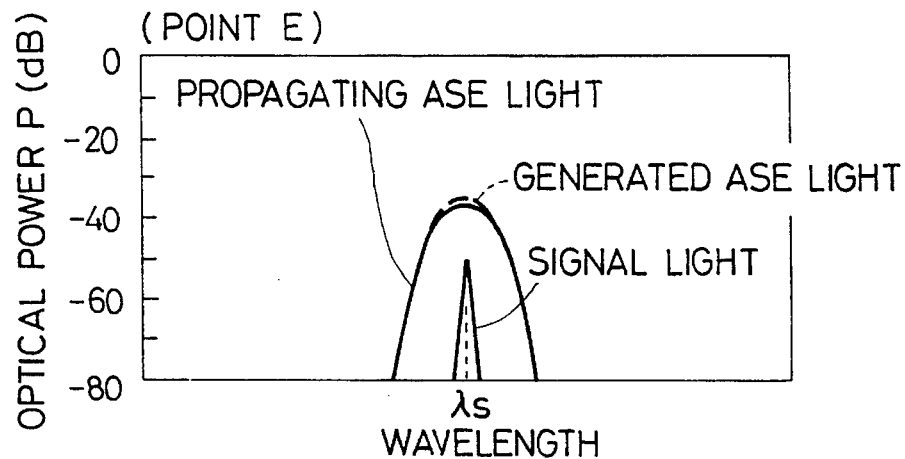
Figure 13A:
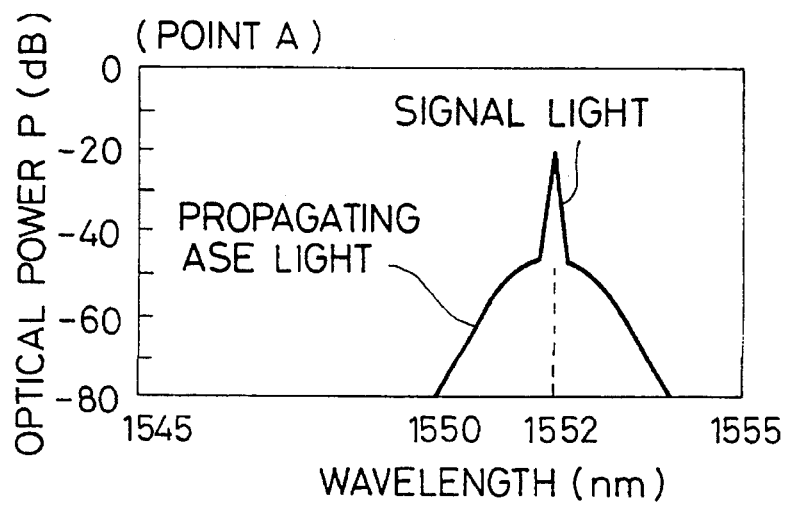
FIGS. 13A, 13B, and 13C are graphs of optical power versus wavelength at points A, B, and C in the apparatus of FIG. 12.

Now, when this configuration of FIG. 12 is provided as the second stage linear repeater in the optical transmission system formed by cascaded linear repeaters such as that shown in FIG. 2 described above, the spectra at the point A on an input side appear as shown in FIG. 13A. As can be seen in FIG. 13A, the lights entering into this linear repeater is predominantly the signal light. The splitter 11 splits these entering lights at a splitting ratio of 13 dB, i.e., 20:1, and supplies the split small fraction of the entering lights to the optical receiver 12. When the optical power of the received light at the optical receiver 12 is equal to −34 dBm, since the signal light loss between the point A and the optical receiver 12 including the signal light excess loss is equal to 14 dB in this case, the input signal optical power $P_{s,in}$ is equal to (−34+14) dBm=−20 dBm. At this point A, the total ASE optical power is about −40 dBm.

Figure 13B:
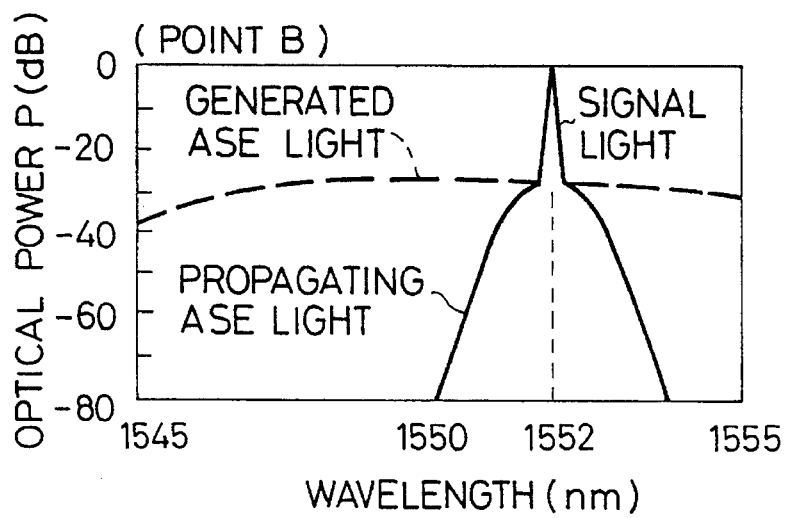

The signal light and the propagating ASE light transmitted through the splitter 11 are amplified at the erbium doped fiber 33a while the generated ASE light is also added, and outputted to the point B. In this case, the spectra at the point B appear as shown in FIG. 13B. The splitter 13 splits these lights outputted from the optical amplifier 31a at a splitting ratio of 13 dB, i.e., 20:1, and the splitter 14 further splits the split small fraction at a splitting ratio of 10 dB, i.e., 10:1, and then the narrow bandwidth optical filter 15 removes the ASE lights from the further split small fraction and supplies the remaining signal light to the optical receiver 16. When the optical power of the received light at the optical receiver 16 is equal to −30 dBm, since the signal light loss between the point B and the optical receiver 16 including the signal light excess loss is equal to 26 dB in this case, the output signal optical power $P_{s,out-a}$ is equal to $(-30+26)$ dBm=−4 dBm. Here, the ASE optical power among the optical power obtained at the optical receiver 16 is only about −50 dBm so that it is ignorably small.

Consequently, the gain Ga of the optical amplifier 31a can be calculated from an expression $-20-1-1+Ga-1-1=-4$ holding on the input and output side of the optical amplifier 31a as 20 dB.

Figure 13C:
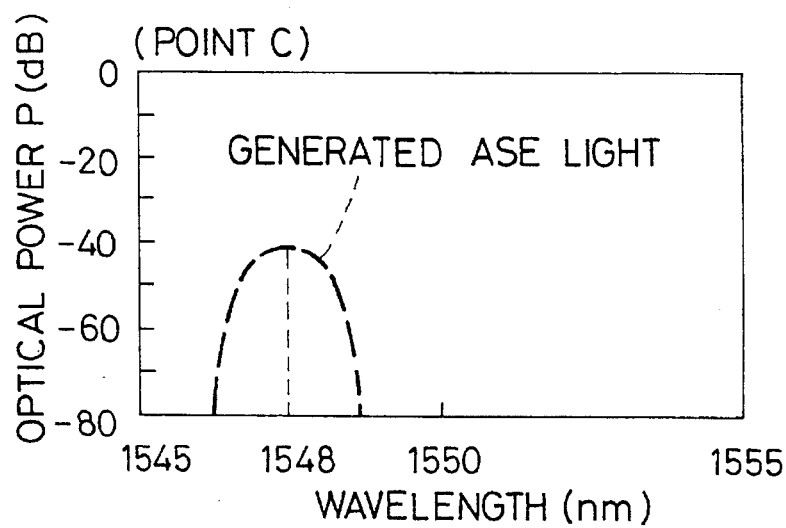

The lights transmitted through the splitter 14 are entered into the narrow bandwidth optical filter 21 to extract the generated ASE light, and the output of this narrow bandwidth optical filter 21 containing predominantly the generated ASE light is supplied to the optical receiver 22. In this case, the spectra at the point C appear as shown in FIG. 13C. When the optical power of the received light at the optical receiver 22 is equal to −41 dBm, since the signal light loss between the point B and the optical receiver 22 including the signal light excess loss is equal to 16 dB in this case, the generated ASE optical power $P_{ASE-a}$ within the transmission bandwidth of 1 nm is equal to $(-41+16)$ dBm=−25 dBm. Here, the optical power of the lights other than the generated ASE light in the optical power obtained at the optical receiver 22 is only about −60 dBm so that it is ignorably small.

Consequently, the generated ASE optical power $P_{ASE-a}$ within the transmission bandwidth of 1 nm at the output side of the optical amplifier 31a can be obtained as −23 dBm, by accounting for the loss at the optical isolator 36b and the splitter 35a.

Then, by substituting the obtained values of Ga=20 dB and $P_{ASE-a}$=−23 dBm into the above equation (9), the approximated noise figure $F_{apr}$ of the optical amplifier can be calculated as 5 dB. Consequently, the effective noise figure of this linear repeater becomes 7 dB, by accounting for the signal light loss at the splitter 11 and the optical isolator 36a on the input side of the optical amplifier 31a, regardless of whether it is of a single stage amplification type or a two-stage amplification type.

On the other hand, the lights transmitted through the splitter 13 are entered into the narrow bandwidth optical filter 32 to remove the ASE lights other than those in a vicinity of the signal light wavelength.

In a case this linear repeater is a single stage amplification type, the output of this narrow bandwidth optical filter 32 is the output of the linear repeater itself, so that the gain and the noise figure of the entire linear repeater can be obtained from the gain and the noise figure of the optical amplifier 31a. In a case this linear amplifier is a two-stage amplification type, the output of this narrow bandwidth optical filter 32 is further amplified by the optical amplifier 31b and the amplified output of this optical amplifier 31b becomes the output of the linear repeater. In this case, the noise figure of the entire linear repeater can be determined as the noise figure of the optical amplifier 31a. In a case it is also necessary to obtain the gain of the entire linear repeater, any conventionally known manner of determining the gain of the linear repeater may be employed in addition.

It is to be noted that the gain of the erbium doped fiber amplifier can be measured by the method other than that described above, such as that disclosed in Japanese Patent Application Laid Open No. 4-356984 (1992).

It is also to be noted that the linear repeater of a multi-stage amplification type may be handled similarly by regarding a plurality of optical amplifiers connected in series as one optical amplifier and applying the above described first embodiment to this one optical amplifier.

Also, a case of using a plurality of narrow bandwidth optical filters in such a multi-stage amplification type linear repeater may be handled similarly to a case of a single stage amplification type linear repeater by connecting the gain detector 10 on an input side of the linear repeater as well as in front of a first narrow bandwidth optical filter of the linear repeater, and the ASE optical power detector 20 in front of the first narrow bandwidth optical filter of the linear repeater.

Figure 14:
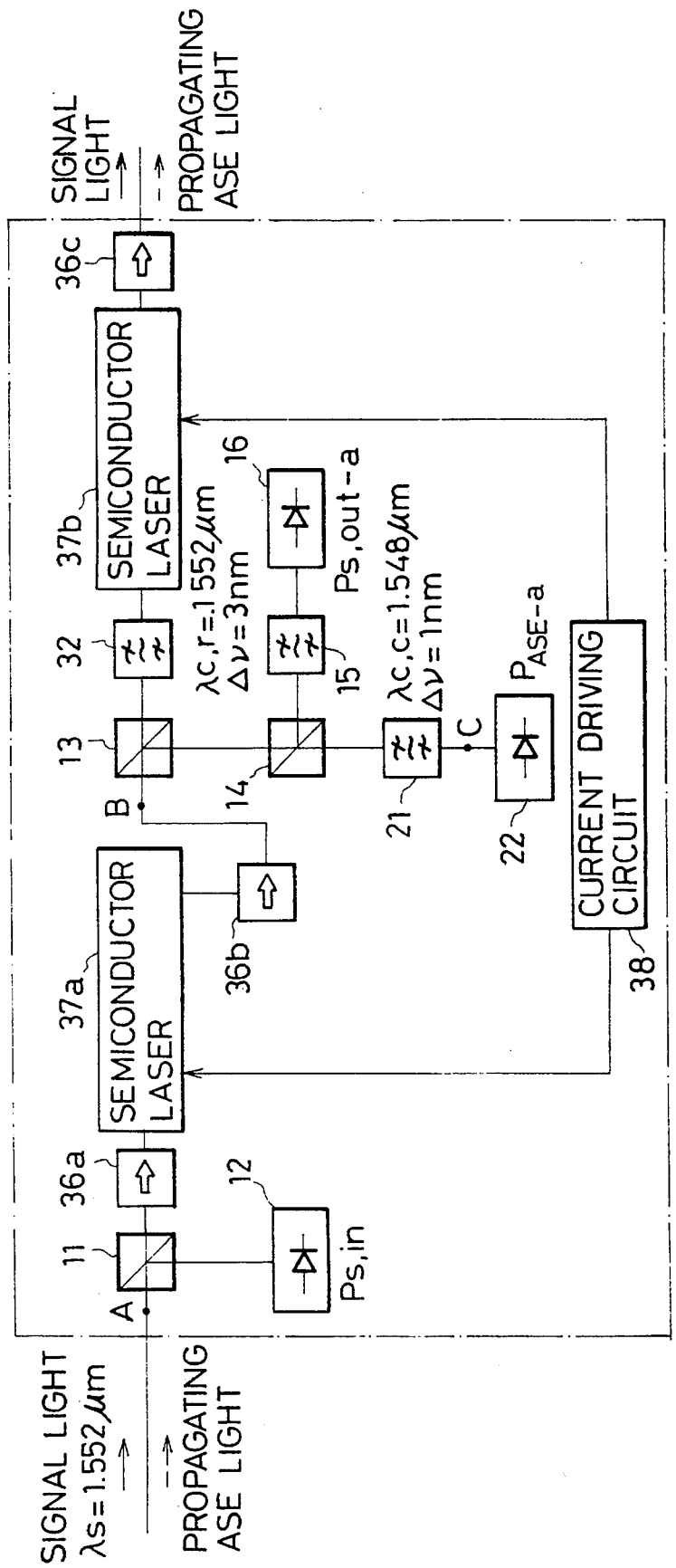
FIG. 14 is a block diagram of another practical implementation of the first embodiment of the noise figure monitoring apparatus.

Referring now to FIG. 14, another specific implementation of the first embodiment just described will be described in detail.

This implementation of FIG. 14 is substantially similar to that of FIG. 12 except that the optical amplifiers 31a and 31b are provided in forms of semiconductor lasers 37a and 37b, which are controlled by a common current driving circuit 38. Similarly to the case of FIG. 12, in this case of FIG. 14, the wavelength λs of the entered signal light is set to 1.552 μm, so that the central transmission wavelength λc,r of the narrow bandwidth optical filter 32 and 15 is also set to 1.552 μm, while their transmission bandwidth Δv is set to 3 nm. On the other hand, the central transmission wavelength λc,c of the narrow bandwidth optical filter 21 is set to 1.548 μm, and its transmission bandwidth is set to 1 nm.

In this implementation of FIG. 14, when the optical power of the received light at the optical receiver 16 is equal to −29 dBm and the optical power of the received light at the optical receiver 22 is equal to −40 dBm as the couplers of the optical amplifiers are omitted, the gain Ga of the semiconductor laser 87a can be calculated as 20 dB, and the generated ASE optical power $P_{ASE-a}$ within the transmission bandwidth of 1 nm at the output side of the semiconductor laser 37a can be obtained as −23 dB, similarly to the implementation of FIG. 12.

Then, by substituting the obtained values of Ga=20 dB and $P_{ASE-a}$=−23 dBm into the above equation (9), the approximated noise figure $F_{apr}$ of the optical amplifier 31a can be calculated as 5 dB. Consequently, the effective noise figure of this linear repeater becomes 7 dB, by accounting for the signal light loss at the splitter 11 and the optical isolator 36a on the input side of the semiconductor laser 37a, regardless of whether it is of a single stage amplification type or a two-stage amplification type.

Figure 15:
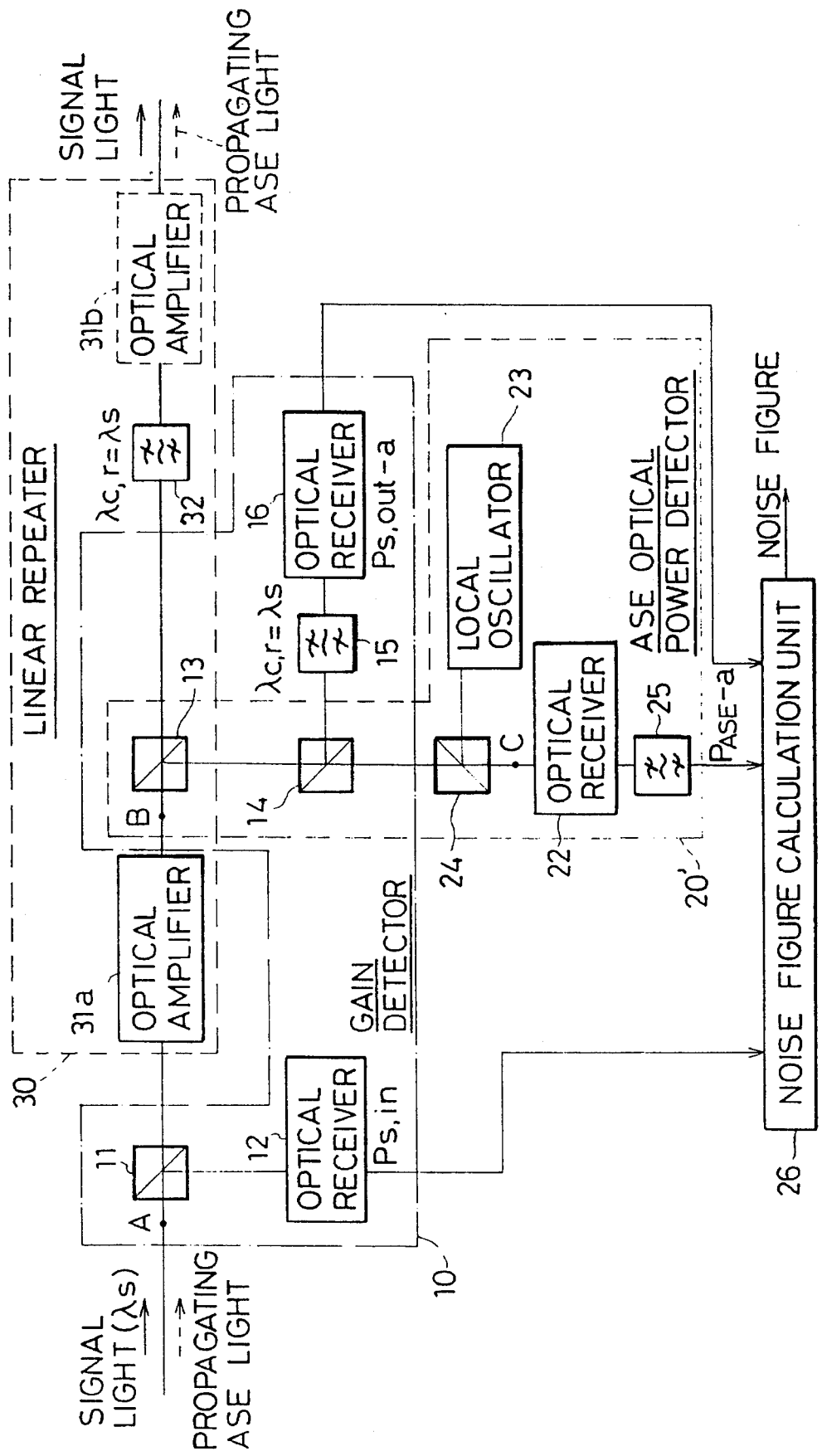
FIG. 15 is a block diagram of a modified configuration for the first embodiment of the noise figure monitoring apparatus.

Referring now to FIG. 15, a modified configuration for the first embodiment of FIG. 10 described above will be described in detail.

In this configuration of FIG. 15, the ASE optical power detector 20 in FIG. 10 is replaced by the ASE optical power detector 20' in which the narrow bandwidth optical filter 21 is replaced by a local oscillator 23 for generating local light with a wavelength $\lambda_{LO}$ different from the wavelength λs of the signal light which is suitable for the heterodyne detection at the optical receiver 22, and a coupler 24 for coupling the local light generated by the local oscillator 28 with the slip lights split by the splitter 13 and transmitted through the splitter 14. In addition, an electrical band-pass filter 25 is provided on an output side of the optical receiver 22, such that the signal indicative of the generated ASE optical power $P_{ASE-a}$ is outputted from this electrical band-pass filter 25 to the noise figure calculation unit 26.

Figure 16:
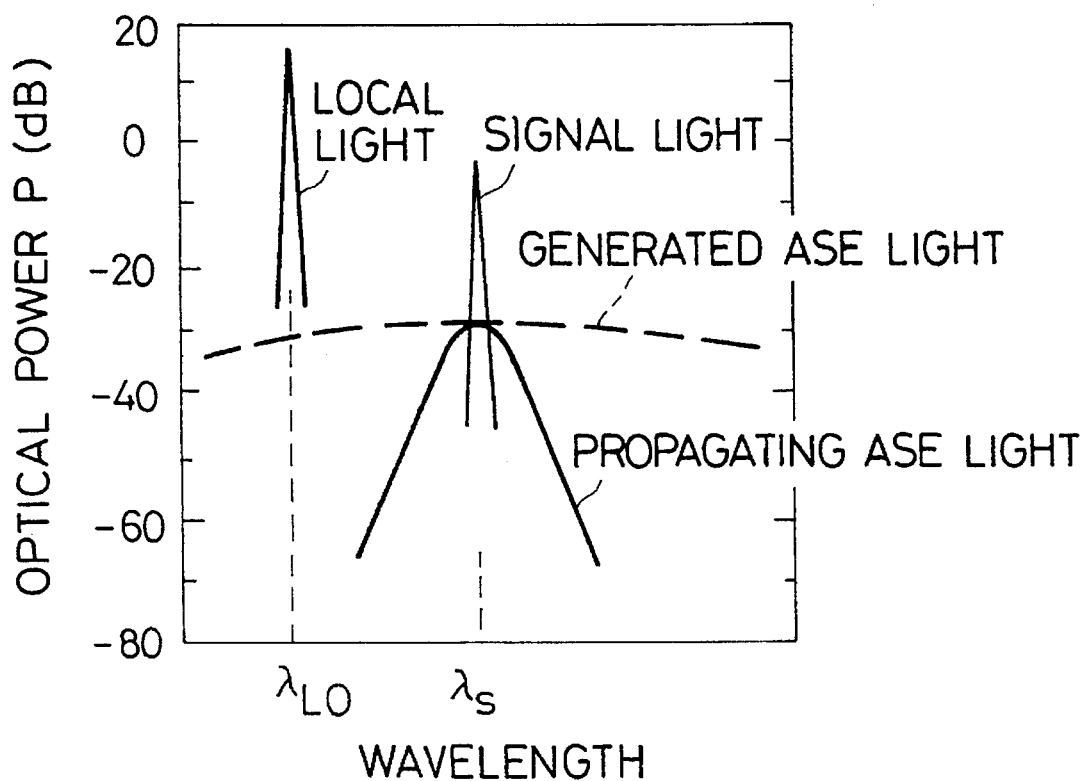
FIG. 16 is a graph of optical electrical power versus wavelength at a point C in the apparatus of FIG. 15.

In this case, the spectra of the lights at the point C between the coupler 24 and the optical receiver 22 appear as shown in FIG. 16, which includes the local light at the wavelength $\lambda_{LO}$, in addition to the signal light, the propagating ASE light, and the generated ASE light.

Figure 17:
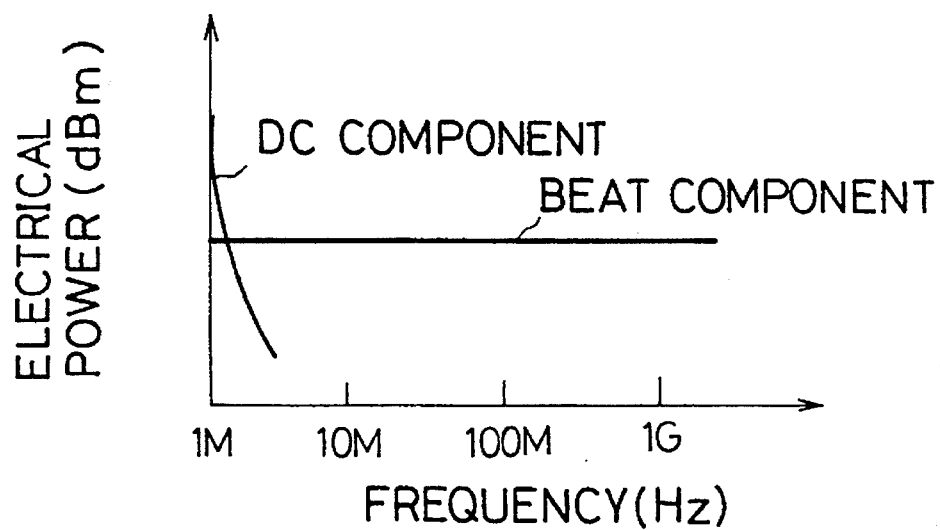
FIG. 17 is a graph of an output power versus frequency for an optical receiver used in an ASE optical power detector of the apparatus of FIG. 15.

When the local light is utilized for the heterodyne detection at the optical receiver 22, the output of the optical receiver 22 has the output power spectrum as shown in FIG. 17 which contains the DC components at the frequency 0 and the beat component between the local light and the generated ASE light.

Figure 18:
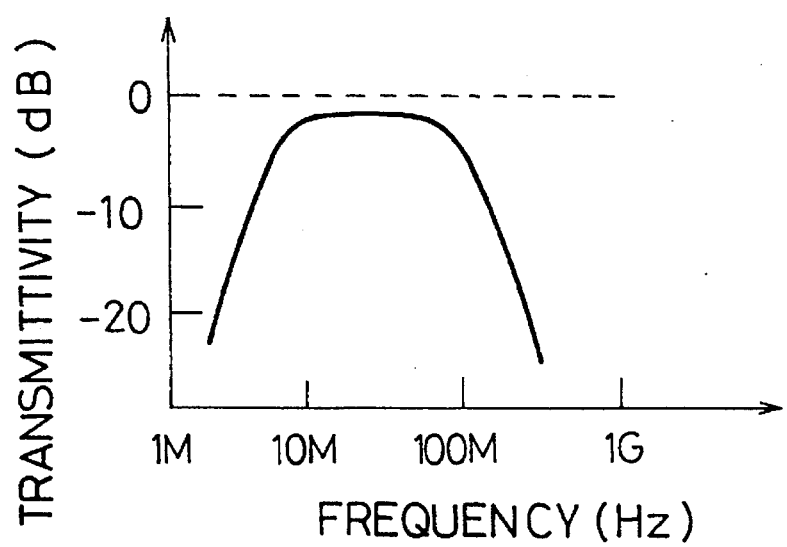
FIG. 18 is a graph of transmittivity versus frequency for an electrical band-pass filter used in an ASE optical power detector of the apparatus of FIG. 15.

The electrical band-pass filter 25 has a transmittivity characteristic as shown in FIG. 18, so that the electrical band-pass filter 25 extracts only the intermediate frequency components from the output of the optical receiver 22 in order to obtain the generated ASE optical power $P_{ASE-a}$ within the transmission bandwidth.

It should be obvious that the same effect of the reduction of the size and the cost of the apparatus can be achieved in this modified configuration just as in the configuration of FIG. 10.

Moreover, in this configuration of FIG. 15, the stability of the operation of the apparatus can be improved compared with the configuration of FIG. 10, as the electrical band-pass filter 25 is capable of realizing more stable operation than the narrow bandwidth optical filter 21 used in the configuration of FIG. 10.

In addition, in this configuration of FIG. 15, the wavelength $\lambda_{LO}$ of the local light can be set closer to the wavelength $\lambda s$ of the signal light, compared with the central transmission wavelength of the narrow bandwidth optical filter 21 used in the configuration of FIG. 10, so that the error in the obtained noise figure can be reduced further. In fact, in this configuration of FIG. 15, it is preferable to displace the wavelength $\lambda_{LO}$ from the wavelength $\lambda s$ of the signal light for approximately 3 nm, which is significantly smaller than the preferable displacement of approximately 5 nm suitable for the configuration of FIG. 10 as described above.

Figure 19:
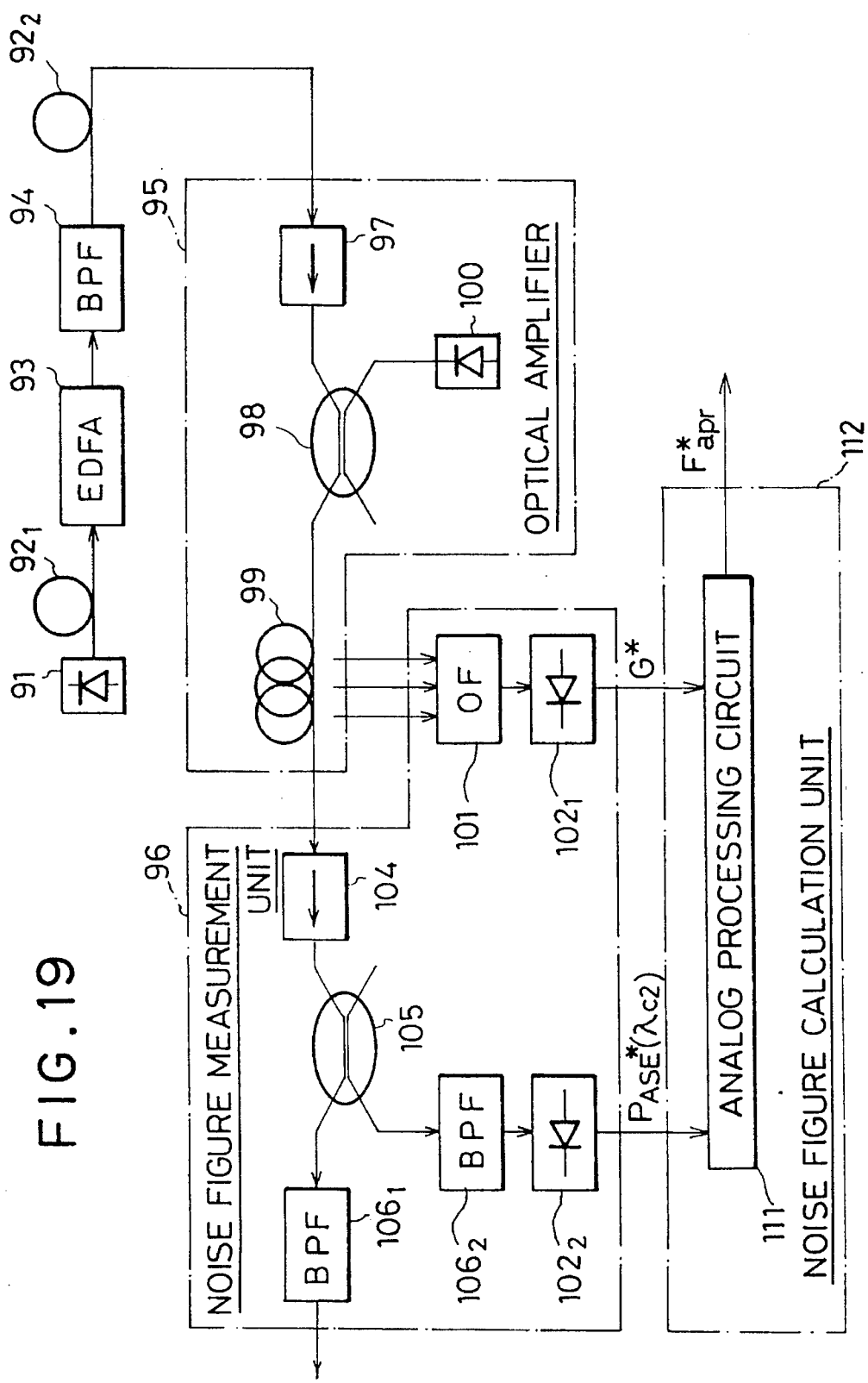
FIG. 19 is a block diagram of a second embodiment of a noise figure monitoring apparatus for an optical amplifier according to the present invention.

Referring now to FIG. 19, a second embodiment of a method and an apparatus for noise figure monitoring according to the present invention will be described in detail. In the following, those elements which are substantially equivalent to the corresponding elements in the configuration of FIG. 5 described above will be given the same reference numerals in the figures and their descriptions will be omitted.

First, the method of obtaining the noise figure according to this second embodiment will be described.

When the logarithm of the both sides of the above described equation (1) is taken to convert the noise figure F, the generated ASE optical power $P_{ASE}(\lambda s)$, and the gain G into the corresponding quantities $F^*$, $P_{ASE}^*(\lambda s)$, and $G^*$ in dB unit, the following equations (10) and (11) can be obtained for the noise figure $F^*$.

$$F^* \approx F_1^* \equiv K + P_{ASE}^*(\lambda s) - G^* + \frac{F \cdot \log_e(10)}{10} \cdot \frac{1}{G} \qquad (10)$$

$$K \equiv -10 \cdot \log_{10}(h \cdot v \cdot \Delta v) \qquad (11)$$

Figure 9:
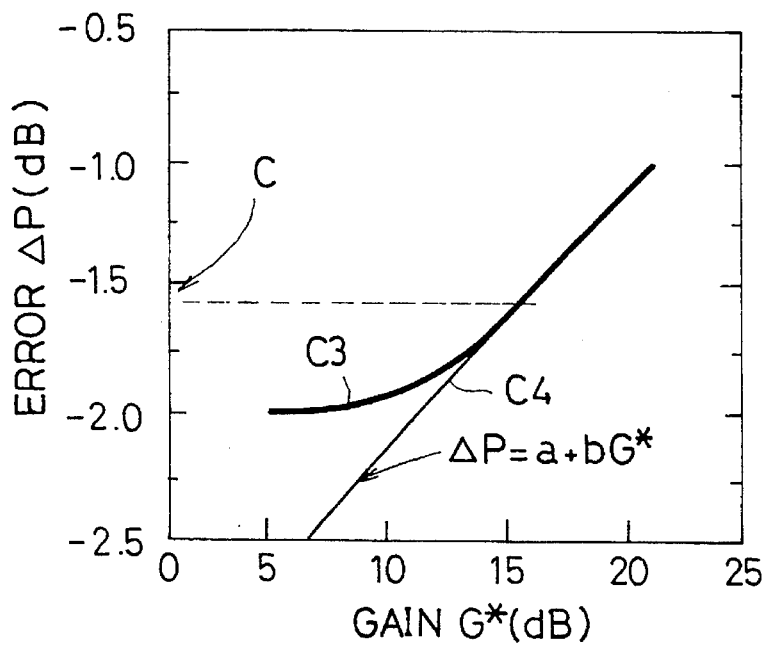
FIG. 9 is a graph of an error of the noise figure obtained by the apparatus of FIG. 5 as a function of the gain.

On the other hand, in view of the dependency of the error $\Delta P$ on the gain $G^*$ as shown in FIG. 9 described above, the following equation (12) can be obtained for the generated ASE optical power $P_{ASE}^*(\lambda s)$ from the above described equation (7).

$$P_{ASE}^*(\lambda s) = P_{ASE}^*(\lambda c2) - \Delta P \qquad (12)$$

$$= P_{ASE}^*(\lambda c2) - \left\{ a + bG^* + \frac{F \cdot \log_e 10}{10 \cdot G} \right\} - \text{Func}(G)$$

where a and b are an intercept and a slope, respectively, of a straight line C4 tangent to the curve C3 of the error $\Delta P$ in FIG. 9, and Func(G) is a difference function representing a difference between the curve C3 and the line C4 shown in FIG. 9.

Then, by substituting this equation (12) into the above equation (10), the following equation (13) for expressing the approximated noise figure $F^*_{apr}$ can be obtained.

$$F^* \approx F^*_{apr} \equiv K + P_{ASE}^*(\lambda c2) - a - (1+b)G^* - \text{Func}(G) = \qquad (13)$$

$$K_2 + P_{ASE}^*(\lambda c2) - K_3 \cdot G^* - \text{Func}(G)$$

where $K_2 = K - a$ and $K_3 = 1 + b$.

Moreover, when the difference function Func(G) is ignored, the equation (13) can be further approximated by the following equation (14).

$$F^*_{apr} \approx K_2 + P_{ASE}^*(\lambda c2) - K_3 \cdot G^* \qquad (14)$$

Now, the gain $G^*$ can also be expressed in terms of the photoelectric current $I_{ph}$ outputted from the photo-diode $102_1$ in response to the spontaneous emission light outputted from the erbium doped fiber 99 and the characteristic constants c and d associated with this photo-diode $102_1$, by the following equation (15).

$$G^* = c + d \cdot I_{ph} \qquad (15)$$

On the other hand, the generated ASE optical power $P_{ASEm}^*(\lambda c2)$ obtained at the photo-diode $102_2$ can be expressed in terms of the optical loss J<0 in dB unit from the output terminal of the erbium doped fiber 99 through the optical isolator 104, the fiber monitor 105, and the optical filter $106_2$, to the photo-diode $102_2$, by the following equation (16).

$$P_{ASEm}^*(\lambda c2) = P_{ASE}^*(\lambda c2) + J \qquad (16)$$

Consequently, by substituting these equations (15) and (16) into the above equation (14), the approximated noise figure $F^*_{apr}$ can be expressed by the following equation (17).

$$F^*_{apr} \approx P_{ASEm}^*(\lambda c2) + \alpha - \beta \cdot I_{ph} \qquad (17)$$

where $\alpha \equiv K - J - a - c(1+b)$ and $\beta \equiv d(1+b)$.

Here, in a case the difference function Func(G) is ignored, the constant coefficients $\alpha$ and $\beta$ are the unknowns to be determined by substituting two sets of the actually measured values for $F^*_{apr}$, $P_{ASE}^*(\lambda c2)$, and $I_{ph}$ into the above equation (17) in advance.

Next, a configuration of an apparatus suitable for carrying out the noise figure monitoring by using the method just described will be described with reference to FIG. 19.

Figure 5:
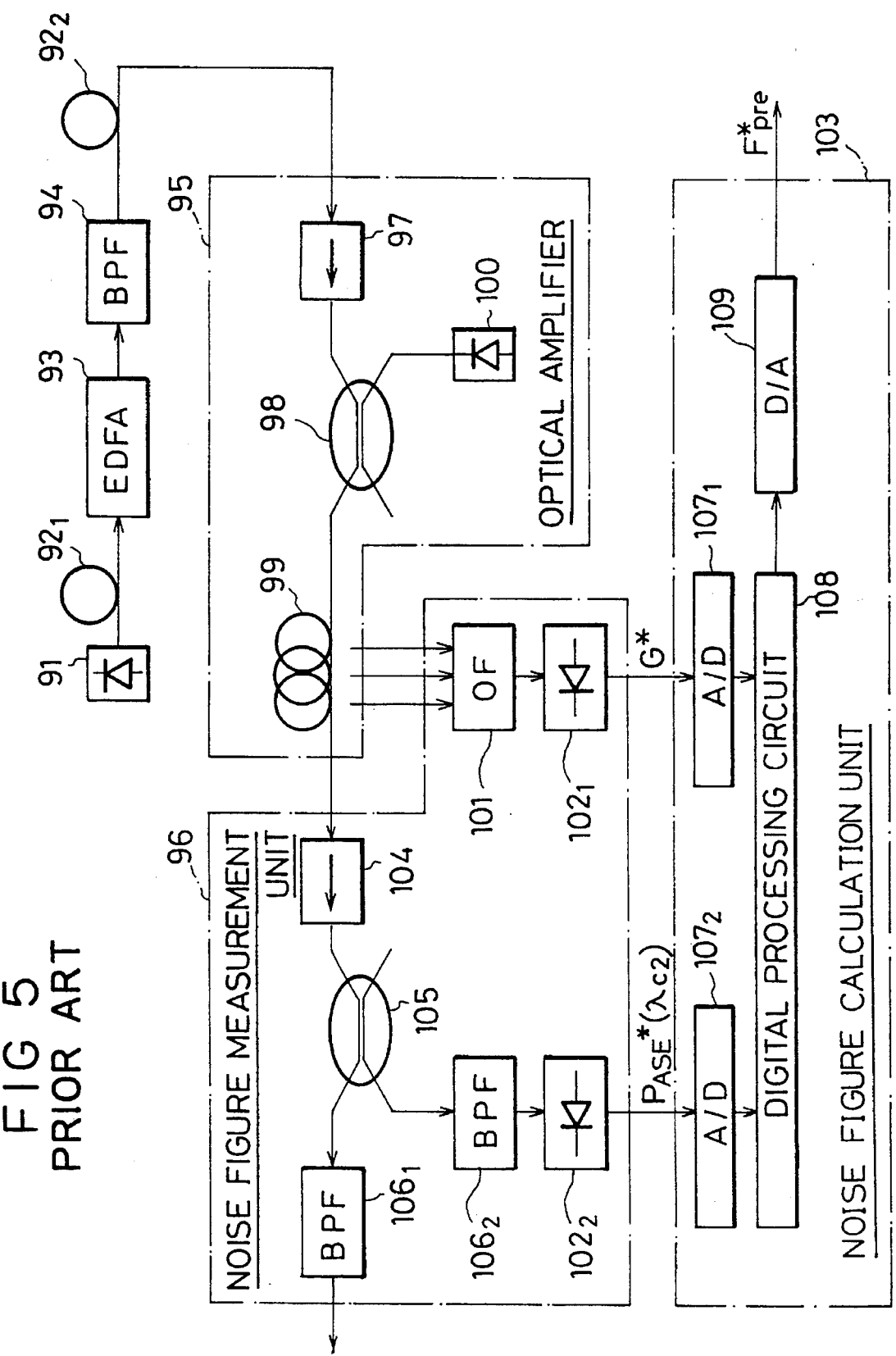
FIG. 5 is a block diagram of a conventional noise figure monitoring apparatus for an erbium doped fiber amplifier.
Figure 6A:
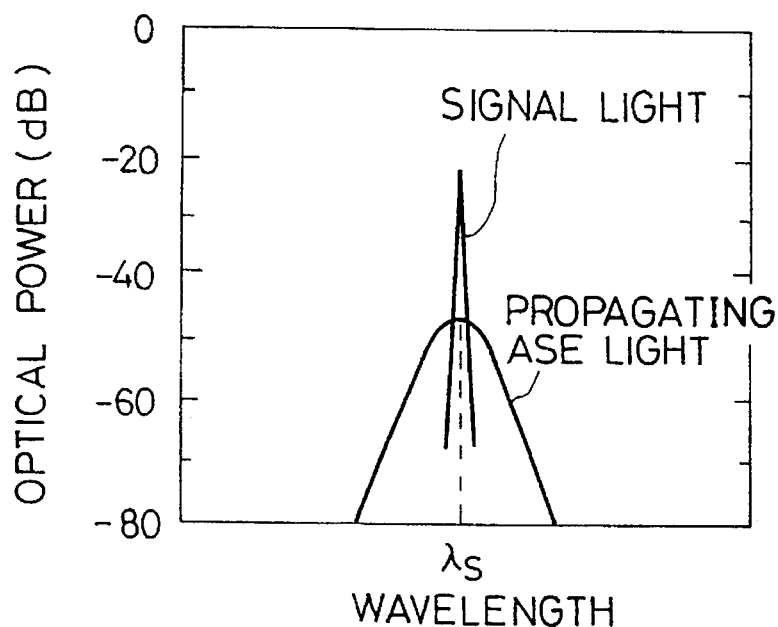
FIGS. 6A, 6B, and 6C are graphs of optical power versus wavelength at three different points in the apparatus of FIG. 5.
Figure 6B:
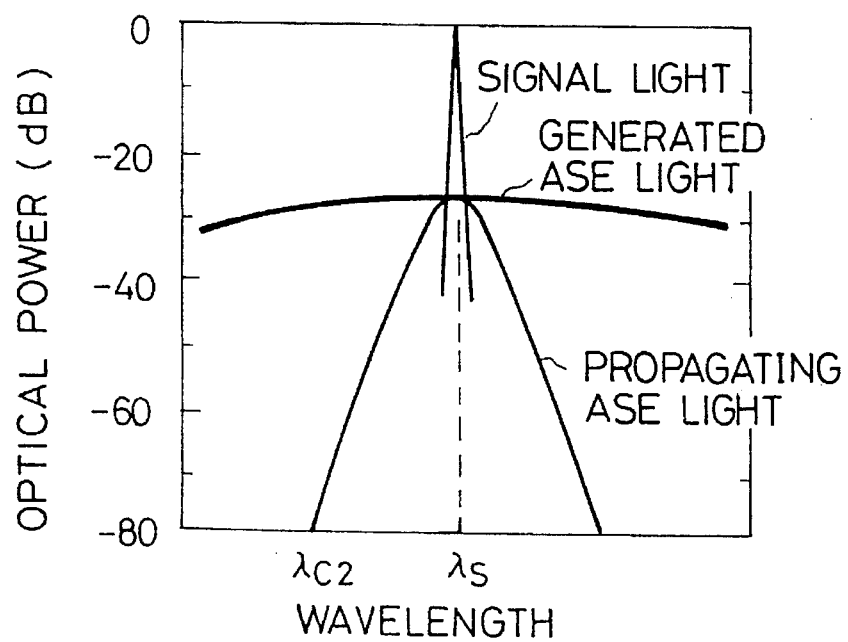
Figure 6C:
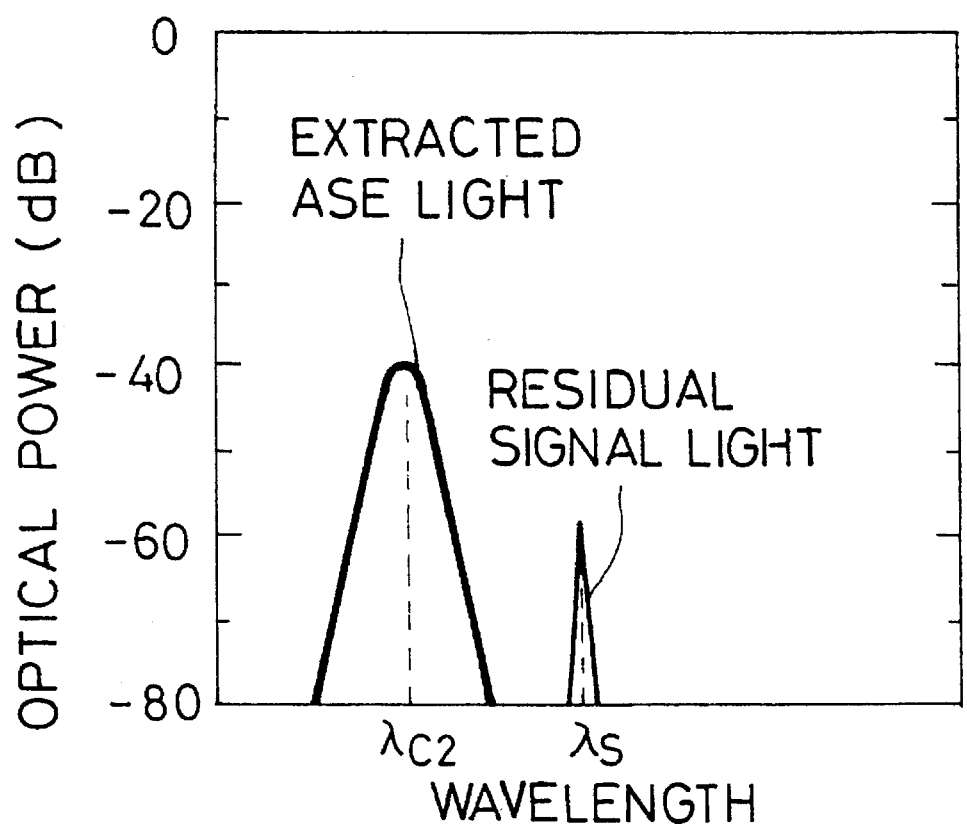
Figure 7A:
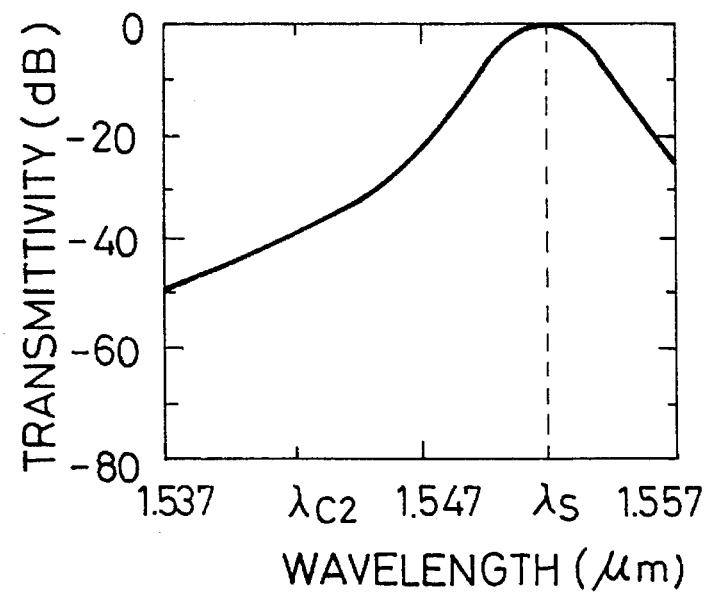
FIGS. 7A and 7B are graphs of transmittivity versus wavelength for two optical filters used in the apparatus of FIG. 5.
Figure 7B:
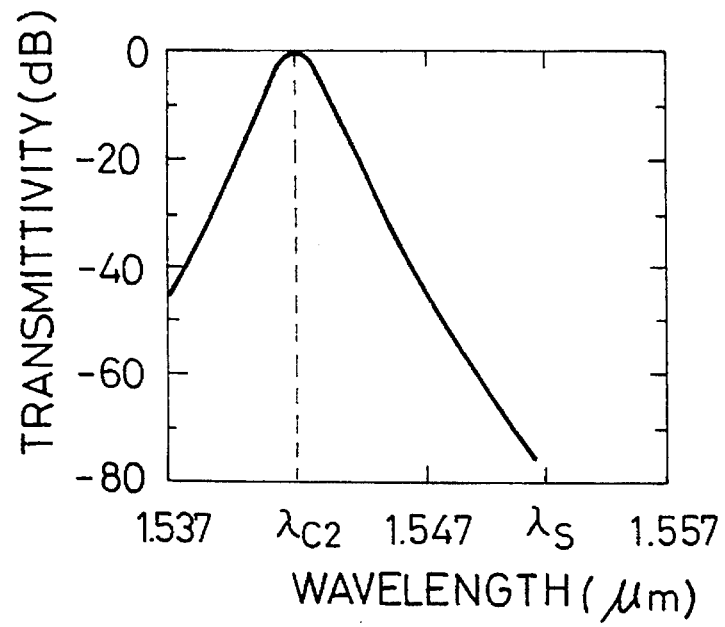
Figure 8:
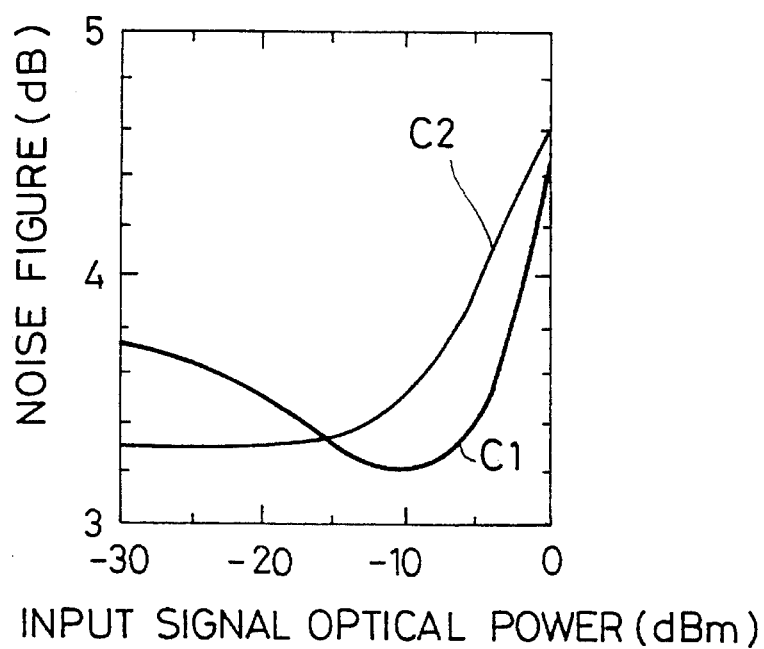
FIG. 8 is a graph of a noise figure obtained by the apparatus of FIG. 5 and a theoretical value for the noise figure as a function of an input signal optical power.

This configuration of FIG. 19 differs from that of FIG. 5 described above in that the noise figure calculation unit 103 using the digital processing circuit 108 in FIG. 5 is replaced by a noise figure calculation unit 112 using an analog processing circuit 111 connected with the photo-diodes $102_1$ and $102_2$ directly. Here, the analog processing circuit 111 carries out the arithmetic calculations according to the equation (17) described above, according to the photoelectric current $I_{ph}$ measured by the photo-diode $102_1$ and the generated ASE optical power $P_{ASEm}*(\lambda c2)$ measured by the photo-diode $102_2$, and the constant coefficients $\alpha$ and $\beta$ determined in advance as described above, to obtain the approximated noise figure $F*_{apr}$. Here, only the simple arithmetic calculations are involved in the above equation (17), so that the analog processing circuit 111 is sufficient to carry out this calculation of the approximated noise figure $F*_{apr}$, without requiring any digital processing.

Figure 20:
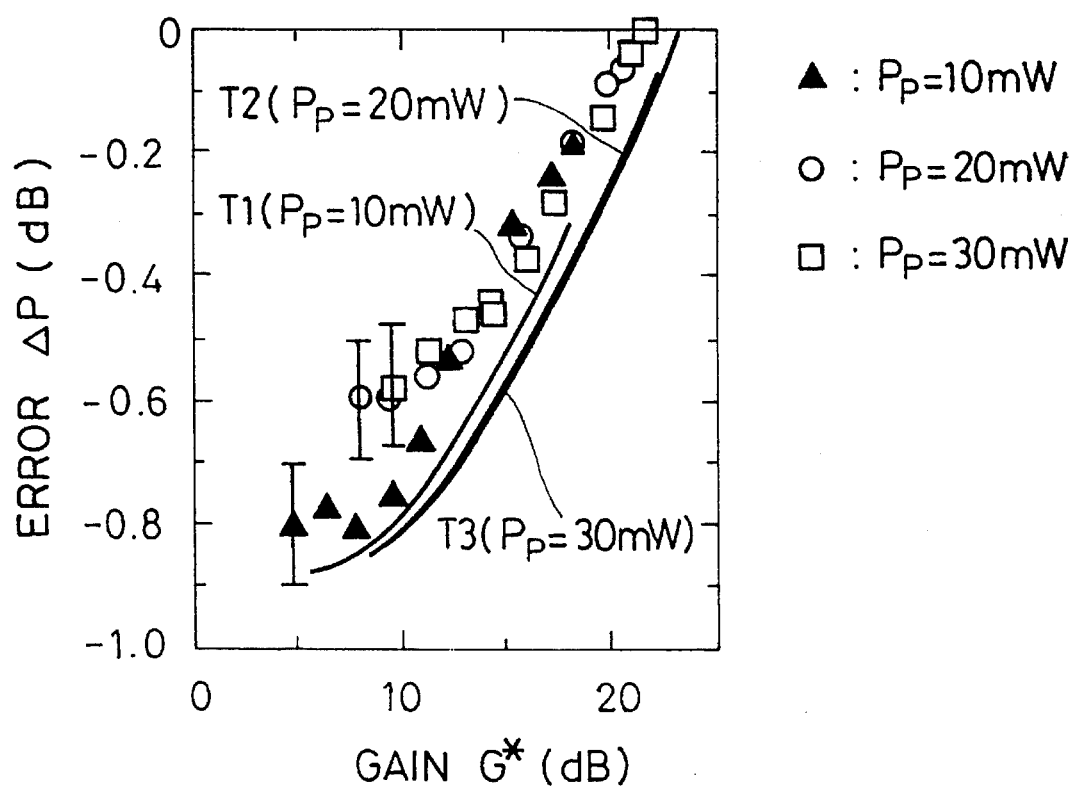
FIG. 20 is a graph of an error of the noise figure obtained by the apparatus of FIG. 19 and the theoretical value of the error for three different values of an optical power for pumping light as a function of the gain.

Now, the error $\Delta P$ in the approximated noise figure $F*_{apr}$ due to the use of the generated ASE optical power $P_{ASE}(\lambda c2)$ for approximating the generated ASE optical power $P_{ASE}(\lambda s)$ as expressed by the above equation (12) had been checked experimentally, the result of which is shown in FIG. 20. In this FIG. 20, measured data for the error $\Delta P$ in cases of using the optical power level $P_P$ of the pumping light supplied to the erbium doped fiber 99 equal to 10 mW (triangular marks), 20 mW (circular marks), and 30 mW (rectangular marks) are plotted along with theoretical values indicated by curves T1 ($P_P$=10 mW), T2 ($P_P$=20 mW), and T3 ($P_P$=30 mW), where the values of the error $\Delta P$ are normalized with respect to the maximum value such that the maximum value corresponds to 0 dB. As can be seen in FIG. 20, the above equation (12) is valid for a wide range of the values for the gain $G*$.

Figure 21:
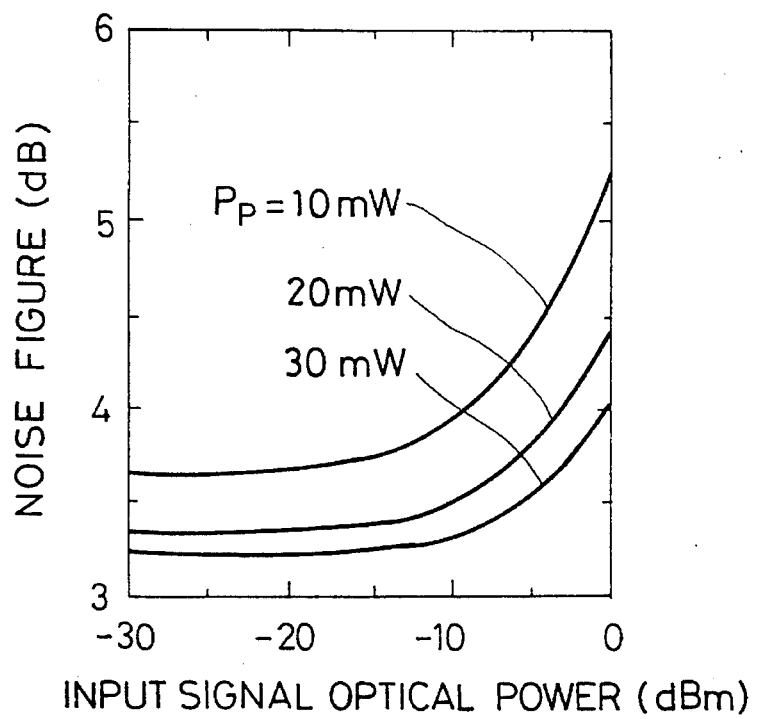
FIG. 21 is a graph of a noise figure obtained by the apparatus of FIG. 19 for three different values of an optical power for pumping light as a function of an input signal optical power.
Figure 22:
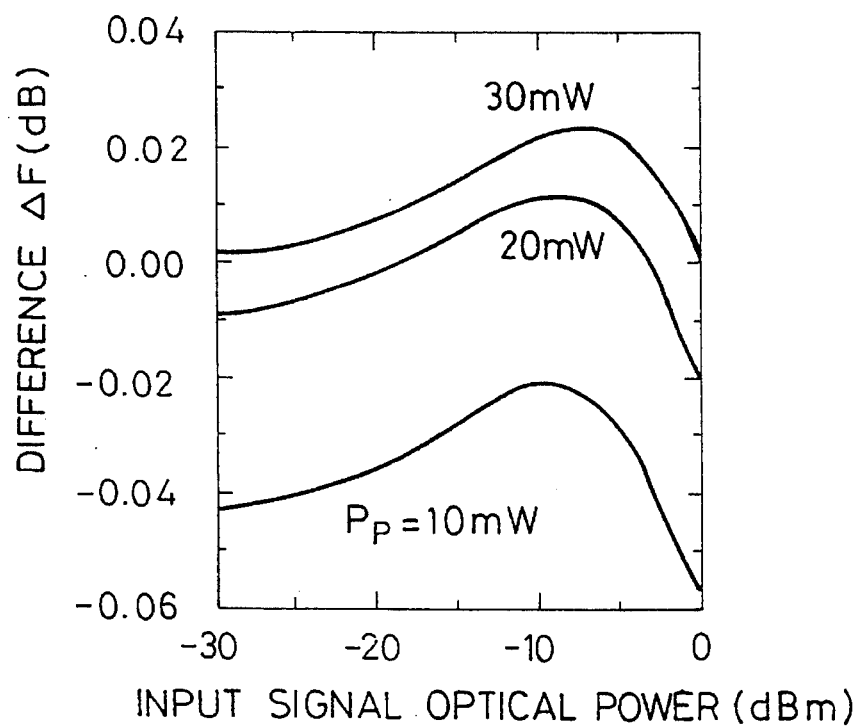
FIG. 22 is a graph of a difference between the noise figure obtained by the apparatus of FIG. 19 and the theoretical value of the noise figure for three different values of an optical power for pumping light as a function of an input signal optical power.

Moreover, the approximated noise figure $F*_{apr}$ obtained by the above equation (13) varies according to the input signal optical power as shown in FIG. 21, for the optical power of the pumping light $P_P$=10 mW, 20 mW, and 30 mW, while the difference $\Delta F$ between this approximate noise figure $F*_{apr}$ and the noise figure $F*$ obtained according to the above equation (1) varies according to the input signal optical power as shown in FIG. 22, for the optical power of the pumping light $P_P$=10 mW, 20 mW, and 30 mW. It can be seen in FIG. 22 that the difference $\Delta F$ takes a small value within a range of −0.06 dB to +0.03 dB, which implies the high accuracy over a wide operational range of the optical amplifier 95.

Figure 23A:
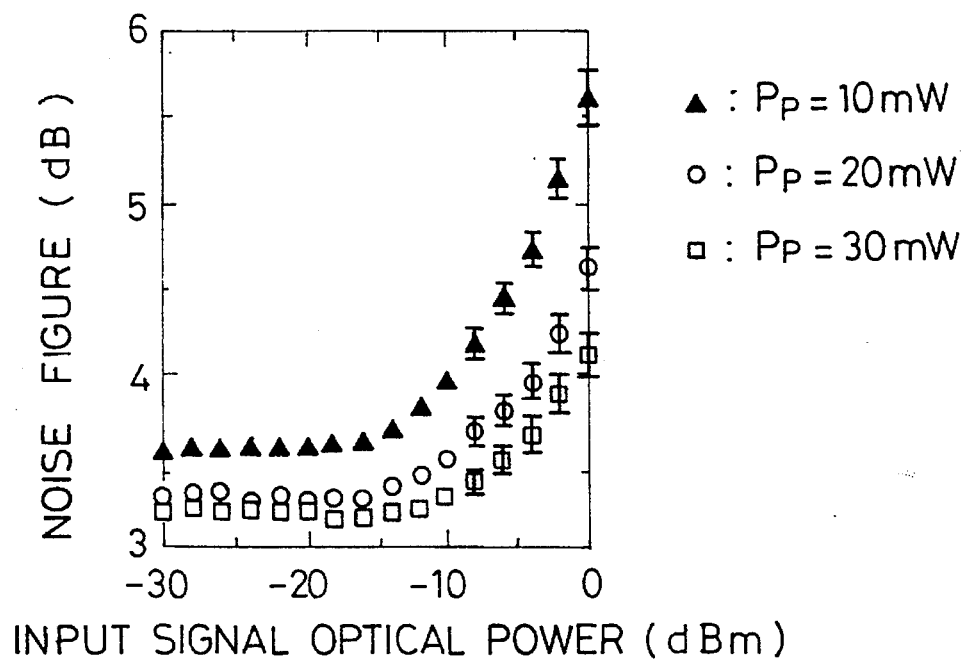
FIGS. 23A, 23B, and 23C are graphs of the noise figures obtained by the known method, the noise figures obtained by the apparatus of FIG. 5, and the noise figures obtained by the apparatus of FIG. 19, respectively, as a function of an input signal optical power, for three different values of an optical power for pumping light.
Figure 23B:
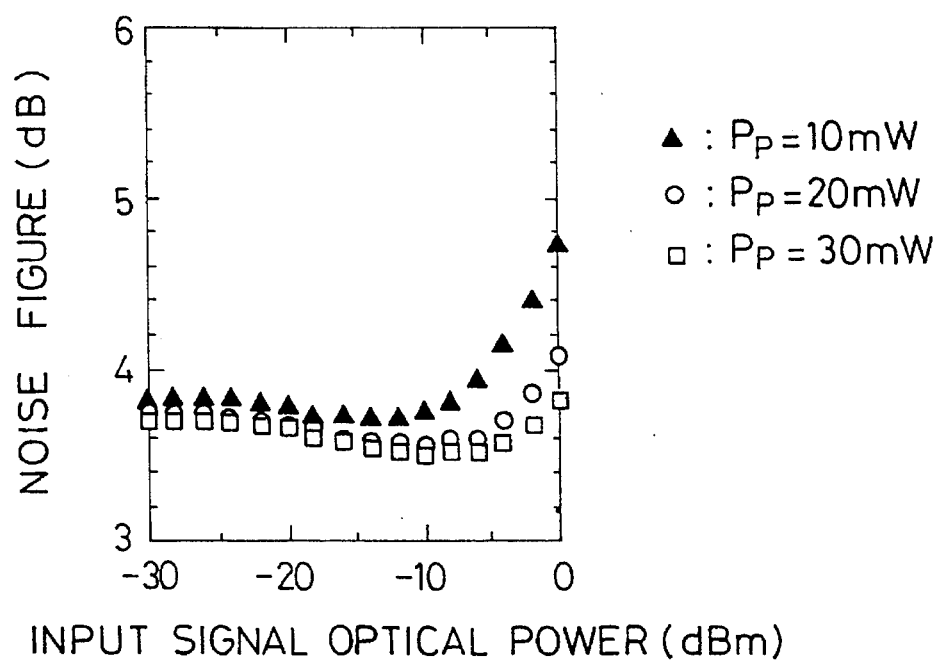
Figure 23C:
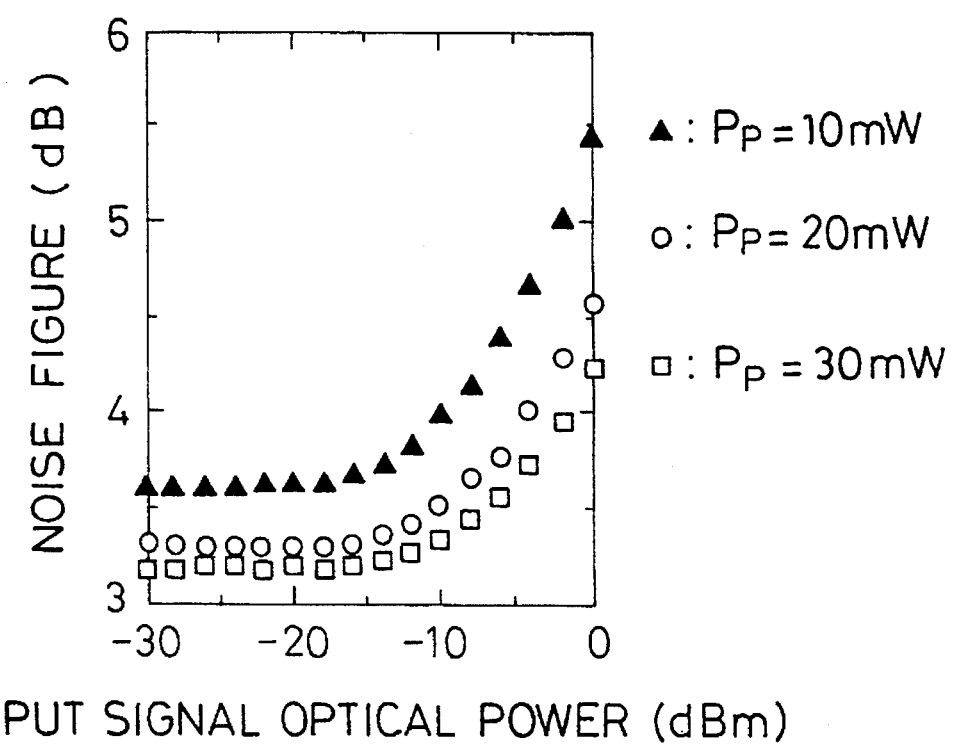

In addition, the accuracy of the approximated noise figure $F*_{apr}$ obtained by the above equation (17) had been checked experimentally, by measuring the noise figures for the optical power of the pumping light $P_P$=10 mW (triangular marks), 20 mW (circular marks), and 30 mW (rectangular marks) as shown in FIG. 23C, in comparison with the accurate values obtained by using the known method described by J. Aspell et al. In "Optical Fiber Communication Conference Technical Digest", pp. 189–190, 1992, which is shown in FIG. 23A, and the values obtained by using the conventional apparatus of FIG. 5 described above, which is shown in FIG. 23B. Here, the result shown in FIG. 23C had been obtained by using the values of the constant coefficients $\alpha$ and $\beta$ ($\alpha$=89.453 dB, $\beta$=0.22266 dB/nA) determined by the least mean square method applied to a case of the optical power for the pumping light $P_P$=20 mW, the measured value of the generated ASE optical power $P_{ASEm}*(\lambda c2)$=−57.2 dBm to −42.1 dBm, and the measured value of the photoelectric current $I_{ph}$=120 nA to 198 nA. As can be seen in these FIGS. 23A, 23B, and 23C, the difference between the accurate values of FIG. 23A and the approximated value of FIG. 23C according to the above equation (17) is in a range of −0.06 dB to +0.07 dB, which is comparatively smaller than the difference between the accurate value of FIG. 23A and the conventional value of FIG. 23B which is in a range of −0.7 dB to +0.6 dB.

Furthermore, the stability of the approximated noise figure $F*_{apr}$ obtained by the above equation (17) had been checked experimentally by conducting the measurement under the identical condition during eight hours period, during which the measured value varied within a small range of ±0.03 dB, which implies the significant stability of the method of this second embodiment.

Thus, according to this second embodiment, it becomes possible to provide a method and an apparatus for monitoring the noise figures of the optical amplifiers, capable of simplifying the calculations required in obtaining the noise figures, while improving the accuracy of the calculated noise figures.

In particular, in this second embodiment, the variation of the error $\Delta P$ with respect to the variation of the gain $G*$ due to the saturation characteristic of the gain $G*$ characteristic to the optical amplifier and the variation of the ASE optical power with respect to the variation of the gain $G*$ is approximated by a straight line as indicated in FIG. 9, and the approximate noise figure $F*_{ASE}$ is calculated by using the measured values of the gain $G*$ and the ASE optical power $P*_{ASE}$ in terms of simple arithmetic calculations, so that the calculational processing required in obtaining the noise figure is considerably simplified as it calls for no complicated functional calculation.

In addition, the approximated noise figure so obtained is much more accurate than the noise figure obtained by the conventional apparatus by ignoring the variation of the error $\Delta P$.

In other words, in this second embodiment, the accuracy in the calculation is improved by suppressing the variation of the error $\Delta P$ with respect to the variation of the gain $G*$, so that it becomes possible to set up the selective transmittivity of the optical filters $106_1$ and $106_2$ very sharply compared with the conventional apparatus, while also the sizes of the hardware and software required for obtaining the approximated noise figure can be reduced considerably.

Figure 24:
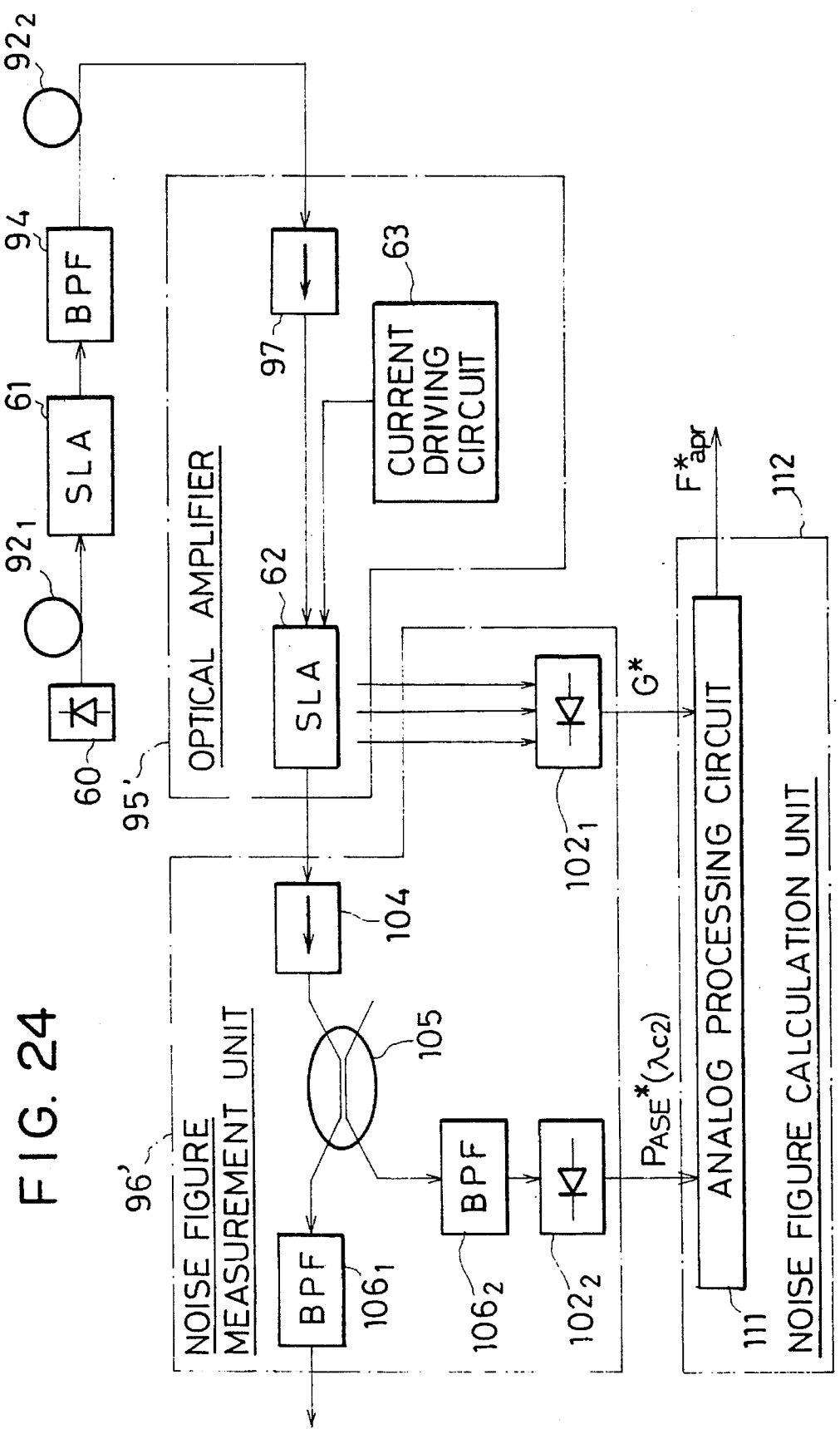
FIG. 24 is a block diagram of one modified configuration for the second embodiment of the noise figure monitoring apparatus.

Referring now to FIG. 24, one modified configuration for the above described second embodiment will be described in detail.

This configuration of FIG. 24 differs from that of FIG. 19 in that the laser diode 91 in FIG. 19 is replaced by a distribution feedback type laser diode 60 for generating the laser beam with the wavelength equal to 1.300 µm, the optical amplifier (EDFA) 93 in FIG. 19 is replaced by a semiconductor laser amplifier (SLA) 61, the optical amplifier 95 in FIG. 19 is replaced by an optical amplifier 95' in which the fiber coupler 98 and the erbium doped fiber 99 in FIG. 19 are replaced by a semiconductor laser amplifier (SLA) 62 and the laser diode 100 in FIG. 19 is replaced by a current driving circuit 63, and the noise figure measurement unit 96 in FIG. 19 is replaced by a noise figure measurement unit 96' in which the optical filter 101 in FIG. 19 is removed.

Also, in correspondence to the wavelength 1.300 µm of the laser beam generated by the laser diode 60, the photo-diode $102_1$ having a light receiving region diameter equal to 1 mm, the optical filter $106_1$ having a transmission half bandwidth equal to 3 nm, and the optical filter $106_2$ having a transmission half bandwidth equal to 2 nm and a central transmission wavelength $\lambda c2$ equal to 1.285 µm are used. In addition, the semiconductor laser amplifier 62 has the unsaturated gain of 25 dB when the driving current supplied from the current driving circuit 63 is equal to 100 mA. The rest of this configuration of FIG. 24 is substantially identical to that of FIG. 19.

Figure 25:
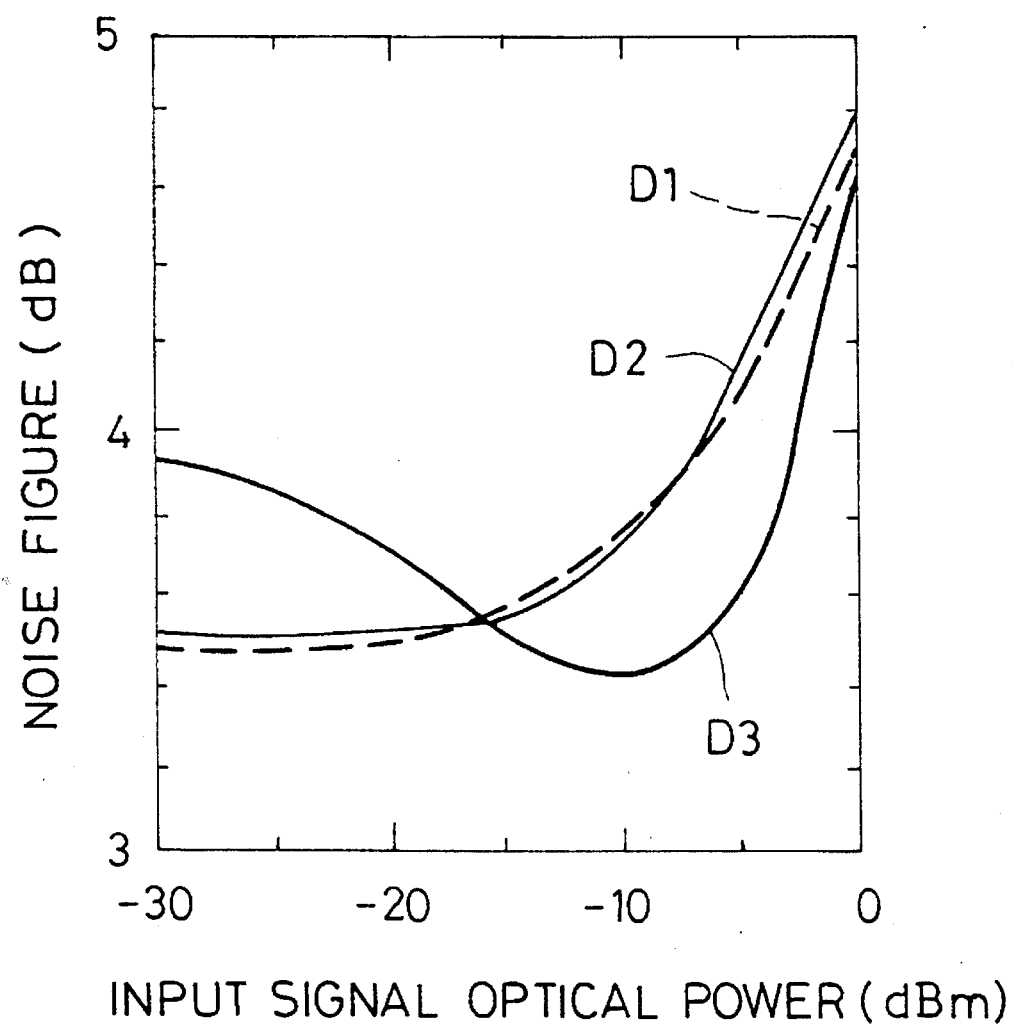
FIG. 25 is a graph of a noise figure obtained by the apparatus of FIG. 24, a theoretical value for the noise figure, and a noise figure obtained by the apparatus of FIG. 5, as a function of an input signal optical power.

The approximated noise figure $F*_{apr}$ obtained in this configuration of FIG. 24 is plotted as a curve D1 (dashed line) in FIG. 25, in contrast to the accurate value plotted as a curve D2 (thin slid line) and the value obtained by using the above equation (9) plotted as a curve D3 (bold solid line). It can be seen in FIG. 25 that the difference between the curves D1 and D2 is within a range of −0.1 dB to +0.1 dB, which is significantly narrower than a range of −0,6 dB to +0.4 dB within which the difference between the curves D2 and D3 lies.

Thus, in this modified configuration of FIG. 24, it also becomes possible to provide a method and an apparatus for monitoring the noise figures in the optical amplifiers, capable of simplifying the calculations required in obtaining the noise figures, while improving the accuracy of the calculated noise figures.

Figure 26:
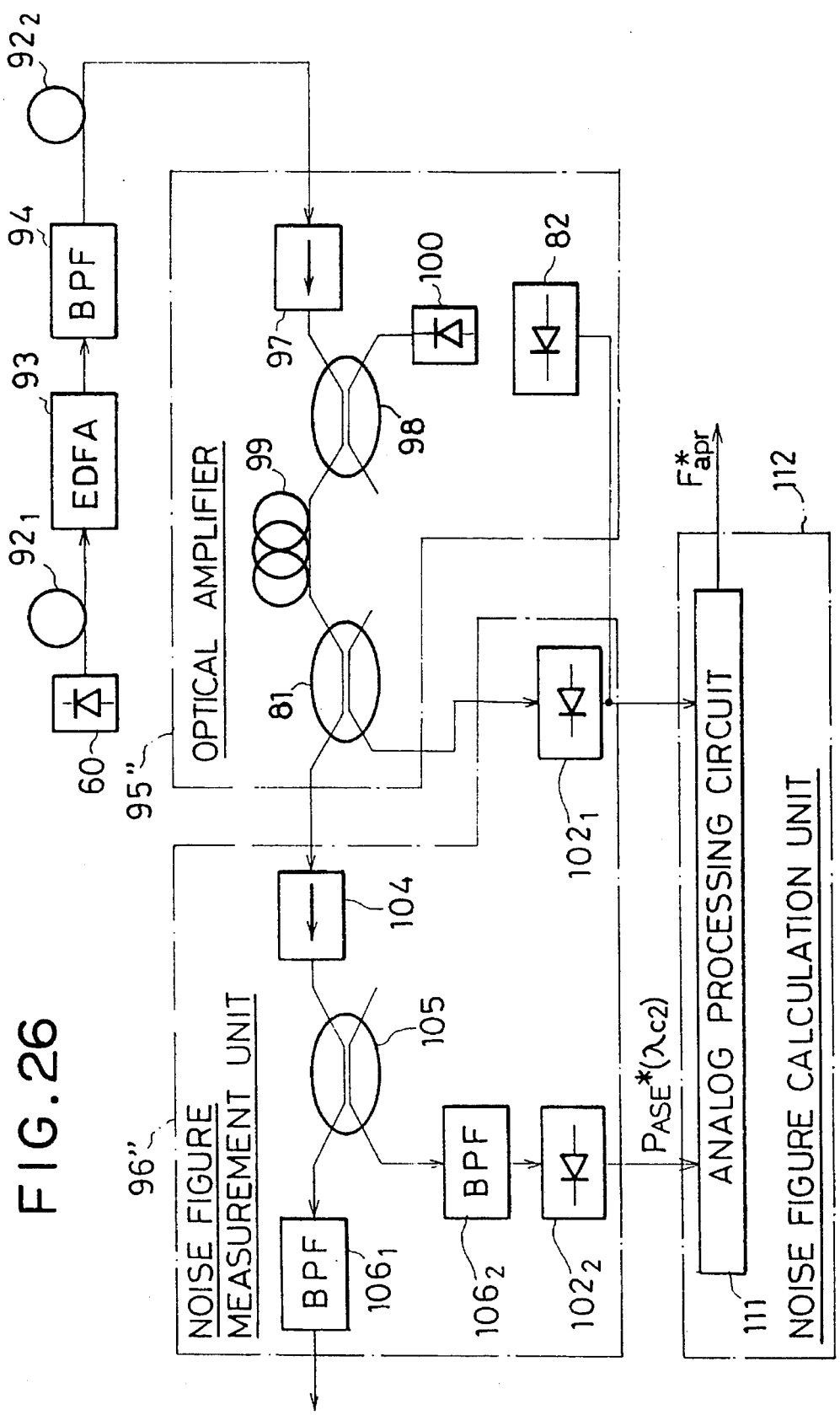
FIG. 26 is a block diagram of another modified configuration for the second embodiment of the noise figure monitoring apparatus.

Referring now to FIG. 26, another modified configuration for the above described second embodiment will be described in detail.

This configuration of FIG. 26 differs from that of FIG. 19 in that the optical amplifier 95 in FIG. 19 is replaced by an optical amplifier 95" in which a fiber coupler 81 is provided on an output side of the erbium doped fiber 99 and a photo-diode 82 optically coupled with the laser diode 100 is provided in addition, while the noise figure measurement unit 96 in FIG. 19 is replaced by a noise figure measurement unit 96" in which the optical filter 101 in FIG. 19 is removed, the photo-diode $102_1$ receives the pumping light split by the fiber coupler 81, and the output of the photo-diode $102_1$ is supplied to the analog processing circuit 111 of the noise figure calculation unit 112 along with the output of the photo-diode 82 of the optical amplifier 95". The rest of this configuration of FIG. 26 is substantially identical to that of FIG. 19.

In this configuration of FIG. 26, only the manner of obtaining the gain G* of the erbium doped fiber 99 is different from that used in the configuration of FIG. 19, while the manner of obtaining the approximated noise figure by using the obtained gain is identical to that used in the configuration of FIG. 19.

Namely, in this configuration of FIG. 26, the photo-diode 82 detects the optical power of the pumping light generated by the laser diode 100, while the photo-diode $102_1$ detects the optical power of the pumping light transmitted through the erbium doped fiber 99 through the fiber coupler 81. Then, the noise figure calculation unit 112 calculates the loss in dB unit $L_P*$ of the pumping light in the erbium doped fiber 99 from a difference between the photoelectric currents outputted from the photo-diodes 82 and $102_1$, and obtains the gain G* using the following equation (18), which is described in detail in Japanese Patent Application Laid Open No. 5-206555 (1993).

$$G*=e+f \cdot L_P* \qquad (18)$$

where e and f are constants.

In this manner, in this modified configuration of FIG. 26, the approximated noise figure $F*_{apr}$ can be obtained at the same accuracy and reproducibility as in the configuration of FIG. 19 described above.

It is to be noted here that, in the above equation (14), the values of the coefficients and the constant terms are determined by substituting a plurality of sets of the known values for the other terms, but these values may be determined by the other method such as the least mean square method.

Also, in the above equation (13), the difference function Func(G) has been ignored, but this term may be retained in order to account for the terms of the higher degrees in G, provided that it is readily possible to approximate this term by some simple arithmetic calculations and the coefficients and the constants required in such an approximation can readily be obtained in advance.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for monitoring a noise figure of a linear repeater including at least one optical amplifier for amplifying input signal light and at least one narrow bandwidth optical filter for removing amplified spontaneous emission (ASE) light generated at the optical amplifier, the apparatus comprising:

gain detector means for detecting a gain of the optical amplifier;

ASE optical power detector means for detecting an optical power of the ASE light generated at the optical amplifier, including:

splitter means for splitting lights entering into the narrow bandwidth optical filter;

optical filter means having a central transmission wavelength displaced from a wavelength of the input signal light, for extracting the ASE light generated at the optical amplifier from the lights split by the splitter means; and optical power detection means for detecting the optical power of the ASE light extracted by the optical filter means; and noise figure calculation means for calculating the noise figure according to the gain detected by the gain detector means and the optical power of the ASE light detected by the ASE optical power detector means.

2. The apparatus of claim 1, wherein the noise figure calculation means calculates the noise figure by approximating the optical power of the ASE light generated by the optical amplifier at an output side of the linear repeated within a transmission bandwidth of the narrow bandwidth optical filter around the wavelength of the input signal light by the optical power of the ASE light generated by the optical amplifier detected by the optical power detection means within the transmission bandwidth of the narrow bandwidth optical filter around the central transmission wavelength of the optical filter means.

3. The apparatus of claim 1, wherein the noise figure calculation means calculates the noise figure by approximating the gain of the linear repeater by the gain of the optical amplifier detected by the gain detector means.

4. The apparatus of claim 1, wherein the gain detector means further comprises:

first splitter means for splitting lights entering into the optical amplifier;

first optical power detection means for detecting an optical power of the lights split by the first splitter means;

second splitter means for splitting lights outputted from the optical amplifier;

narrow bandwidth optical filter means having a central transmission wavelength equal to the wavelength of the input signal light, for extracting signal light from the lights split by the second splitter means; and second optical power detection means for detecting an optical power of the signal light extracted by the narrow bandwidth optical filter means.

5. The apparatus of claim 4, wherein the second splitter means of the gain detector means and the splitter means of the ASE optical power detector means are provided by a single common splitter, and the gain detector means further comprises third splitter means for splitting the lights split by the single common splitter into the lights to be supplied to the narrow bandwidth optical filter means of the gain detector means and the lights to be supplied to the optical filter means of the ASE optical power detector means.

6. The apparatus of claim 1, wherein in a case the linear repeater contains more than one optical amplifiers, the gain detector means detects a collective gain of those optical amplifiers located on an input side of the narrow bandwidth optical filter closest to an input side of the linear repeater.

7. The apparatus of claim 1, wherein in a case said at least one narrow bandwidth optical filter of the linear repeater contains more than one narrow bandwidth optical filters, the splitter means of the ASE optical power detector means splits the lights entering into one of said more than one narrow bandwidth optical filters closest to an input side of the linear repeater.

8. An apparatus for monitoring a noise figure of a linear repeater including at least one optical amplifier for amplifying input signal light and a narrow bandwidth optical filter for removing amplified spontaneous emission (ASE) light generated at the optical amplifier, the apparatus comprising:

gain detector means for detecting a gain of the optical amplifier;

ASE optical power detector means for detecting an optical power of the ASE light generated at the optical amplifier, including:

splitter means for splitting lights entering into the narrow bandwidth optical filter;

local oscillator means for generating local light having a wavelength displaced from a wavelength of the input signal light;

coupler means for coupling the lights split by the splitter means with the local light generated by the local oscillator means;

optical power detection means for making a heterodyne detection of the optical power of the lights coupled by the coupler means; and electrical band-pass filter means for extracting the optical power of the ASE light generated at the optical amplifier from the optical power obtained by the optical power detection means; and noise figure calculation means for calculating the noise figure according to the gain detected by the gain detector means and the optical power of the ASE light detected by the ASE optical power detector means.

9. A method for monitoring a noise figure of a linear repeater including at least one optical amplifier for amplifying input signal light and at least one narrow bandwidth optical filter for removing amplified spontaneous emission (ASE) light generated at the optical amplifier, the method comprising the steps of:

(a) detecting a gain of the optical amplifier;

(b) detecting an optical power of the ASE light generated at the optical amplifier within a transmission bandwidth of the narrow bandwidth optical filter around a central transmission wavelength displaced from a wavelength of the input signal light; and (c) calculating the noise figure according to the gain detected at the step (a) and the optical power of the ASE light detected at the step (b), by approximating the optical power of the ASE light generated by the optical amplifier at an output side of the linear repeater within the transmission bandwidth of the narrow bandwidth optical filter around the wavelength of the input signal light by the optical power of the ASE light generated by the optical amplifier detected at the step (b) within the transmission bandwidth of the narrow bandwidth optical filter around the central transmission wavelength.

10. The method of claim 9, wherein at the step (c), the noise figure is calculated by replacing the gain of the linear repeater by the gain of the optical amplifier detected at the step (a).

11. The method of claim 9, wherein in a case said at least one narrow bandwidth optical amplifier of the linear repeater contains more than one optical amplifiers, the step (a) detects a collective gain of those optical amplifiers located on an input side of the narrow bandwidth optical filter closes in location to an input side of the linear repeater.

12. The method of claim 9, wherein in a case said at least one optical filter of the linear repeater contains more than one narrow bandwidth optical filters, the step (b) detects the optical power of the ASE light generated at the optical amplifier located immediately in front of one of said more than one narrow bandwidth optical filters closest in location to an input side of the linear repeater.

13. A method of monitoring a noise figure for an optical amplifier for amplifying input signal light, comprising the steps of:

(a) measuring a gain $G^*$ in dB unit of the optical amplifier;

(b) measuring an optical power $P_{ASE}^*$ in dB unit of an amplified spontaneous emission (ASE) light generated by the optical amplifier at a wavelength $\lambda c2$ displaced from a wavelength $\lambda s$ of the input signal light; and (c) calculating an approximate noise figure $F^*_{apr}$ in dB unit by substituting the gain $G^*$ measured at the step (a) and the optical power $P^*_{ASE}$ measured at the step (b) into an equation:

$$F^*_{apr} \approx P_{ASE}^*(\lambda c2) + K_2 - K_3 \cdot G^*$$

where $K_2$ and $K_3$ are constant coefficients.

14. The method of claim 13, further comprising the step of determining values of the constant coefficients $K_2$ and $K_3$ from known sets of the noise figures, the gain, and the optical power of the ASE light, before the step (c).

15. The method of claim 13, wherein the step (a) obtains the gain $G^*$ in dB unit of the optical amplifier from photo-electric current outputted from a photo-diode in response to the ASE light outputted by the optical amplifier.

16. The method of claim 13, wherein the optical amplifier is an erbium doped fiber amplifier having an erbium doped fiber pumped by pumping light, and the step (a) obtains the gain $G^*$ in dB unit of the optical amplifier from a loss of the pumping light in the erbium doped fiber.

17. An apparatus for monitoring a noise figure for an optical amplifier for amplifying input signal light, comprising:

gain detector means for measuring a gain $G^*$ in dB unit of the optical amplifier;

ASE optical power detector means for measuring an optical power $P_{ASE}^*$ in dB unit of an amplified spontaneous emission (ASE) light generated by the optical amplifier at a wavelength $\lambda c2$ displaced from a wavelength $\lambda s$ of the input signal light;

processing means for calculating an approximate noise figure $F^*_{apr}$ in dB unit by substituting the gain $G^*$ measured by the gain detector means and the optical power $P^*_{ASE}$ measured by the ASE optical power detector means into an equation:

$$F^*_{apr} \approx P_{ASE}^*(\lambda c2) + K_2 - K_3 \cdot G^*$$

where $K_2$ and $K_3$ are constant coefficients determined in advance from known sets of the noise figures, the gain, and the optical power of the ASE light.

18. The apparatus of claim 17, wherein the processing means comprises an analog processing circuit for executing arithmetic calculations involved in the equation.

19. The apparatus of claim 17, wherein the gain detector means includes a photo-diode for receiving spontaneous emission light outputted by the optical amplifier and outputting corresponding photoelectric current indicative of the gain $G^*$ in dB unit of the optical amplifier.

20. The apparatus of claim 17, wherein the optical amplifier is an erbium doped fiber amplifier having an erbium doped fiber pumped by pumping light, and the gain detector means includes photo-diodes for measuring a loss of the pumping light in the erbium doped fiber indicative of the gain $G^*$ in dB unit of the optical amplifier.

* * * * *